United States Patent
Taniguchi et al.

(10) Patent No.: US 6,940,646 B2
(45) Date of Patent: Sep. 6, 2005

(54) METHOD AND APPARATUS FOR STEREOSCOPIC IMAGE DISPLAY

(75) Inventors: Naosato Taniguchi, Urawa (JP); Kazutaka Inoguchi, Kawasaki (JP); Hiroshi Nishihara, Yokohama (JP); Tomoshi Takikawa, Yokohama (JP); Yoshihiro Saito, Hadhhoy (JP); Hideki Morishima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/836,368

(22) Filed: Apr. 18, 2001

(65) Prior Publication Data

US 2002/0118452 A1 Aug. 29, 2002

(30) Foreign Application Priority Data

Feb. 23, 2001 (JP) .................................. 2001-048125

(51) Int. Cl.[7] .................. G02B 27/22; G02B 27/10; H04N 13/04
(52) U.S. Cl. .................. 359/463; 359/462; 359/464; 359/621; 359/622; 348/54; 348/59
(58) Field of Search ................. 359/462, 463, 359/465, 464, 620, 621, 622, 623, 624; 348/56, 59, 54; 345/7, 8, 9

(56) References Cited

U.S. PATENT DOCUMENTS

| | | | | |
|---|---|---|---|---|
| 4,132,468 A | * | 1/1979 | Lo et al. | 359/463 |
| 5,663,831 A | * | 9/1997 | Mashitani et al. | 359/463 |
| 5,703,717 A | * | 12/1997 | Ezra et al. | 359/462 |
| 2002/0021492 A1 | * | 2/2002 | Morishima et al. | 359/463 |

FOREIGN PATENT DOCUMENTS

| | | |
|---|---|---|
| JP | 9-311294 | 12/1997 |
| WO | WO 95/05052 | 2/1919 |

* cited by examiner

Primary Examiner—Audrey Chang
(74) Attorney, Agent, or Firm—Fitzpatrick, Cella, Harper & Scinto

(57) ABSTRACT

It is an object of the present invention to provide a stereoscopic image displaying method and a stereoscopic image displaying apparatus using the same, which are capable of excellently observing a stereoscopic image. In order to achieve the object, a stereoscopic image forming apparatus of the present invention is configured such that display light from an image corresponding to a viewpoint of one parallax image on an image displaying device, on which parallax images corresponding to a plurality of different viewpoints can be displayed, is guided to an optical modulator, on which a light transmitting section and a light shielding section can be formed, by a second optical system disposed in the front of the image displaying device, and that the display light transmitted through the light transmitting section of the optical modulator is collected at a position that is a predetermined distance apart corresponding to the viewpoint on an observation surface by a first optical system, and the entire screen of a parallax image to be displayed on the image displaying device is thereby caused to be incident on each eye by controlling transmitted light from the optical modulator in synchronism with the switching of parallax images to be displayed on the image displaying device when an observer attains stereoscopic viewing of the image information on the image displaying device.

3 Claims, 22 Drawing Sheets

LEFT EYE'S IMAGE 6

RIGHT EYE'S IMAGE 7

FIRST SYNTHESISED PARALLAX IMAGE 8

SECOND SYNTHESISED PARALLAX IMAGE 9

FIG. 7
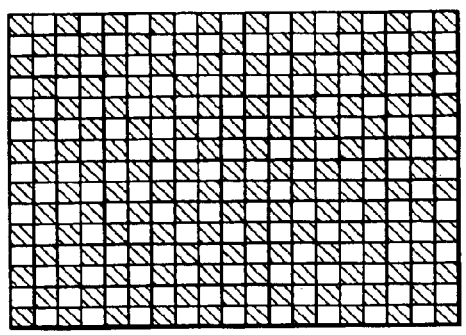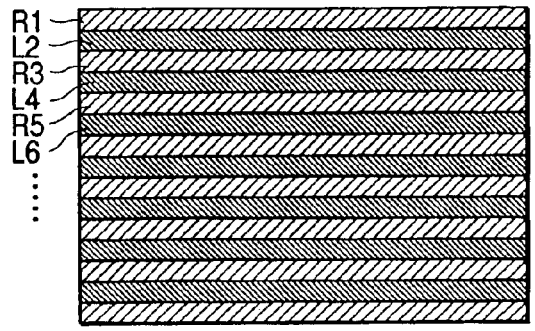
14
SECOND SYNTHESISED PARALLAX IMAGE 9
FIG. 8
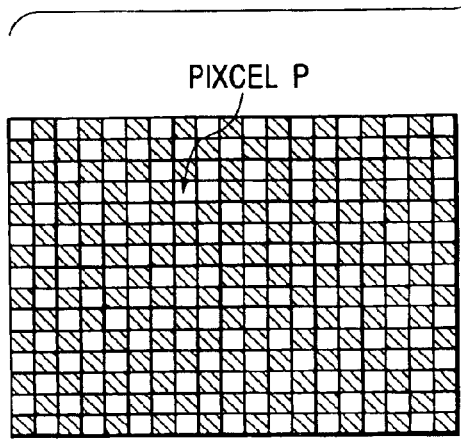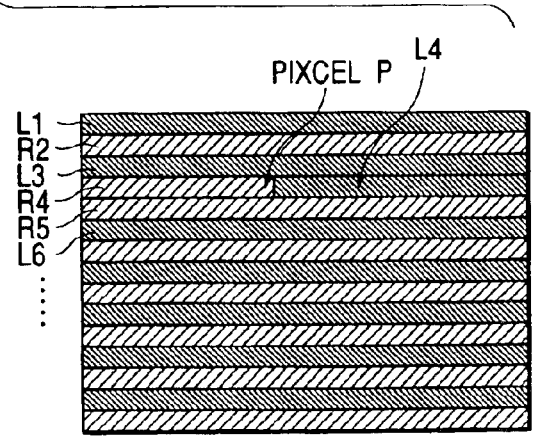
16
13

FIG. 9
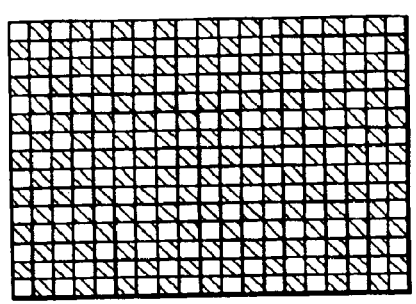
15
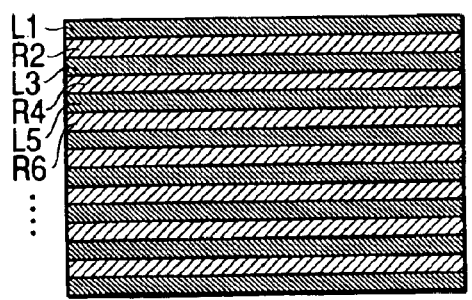
FIRST SYNTHESISED
PARALLAX IMAGE 8
FIG. 10
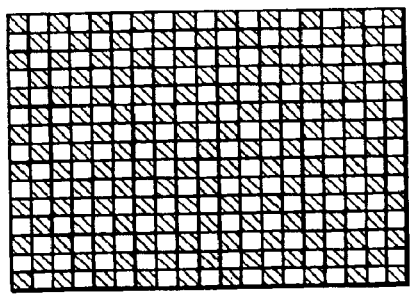
14
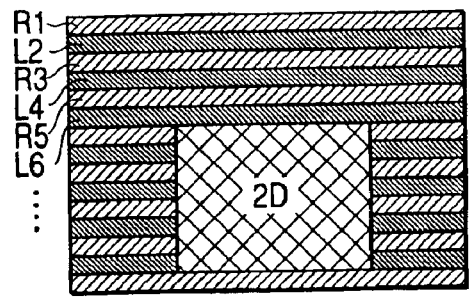
SECOND SYNTHESISED
PARALLAX IMAGE 9
FIG. 11
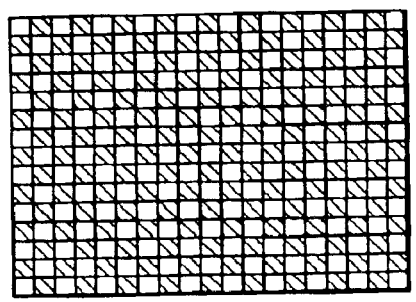
15
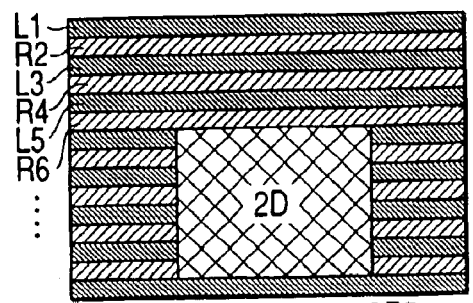
FIRST SYNTHESISED
PARALLAX IMAGE 8

APPLIED VOLTAGE OFF

APPLIED VOLTAGE ON

LEFT EYE'S IMAGE 6'

RIGHT EYE'S IMAGE 7'

METHOD AND APPARATUS FOR STEREOSCOPIC IMAGE DISPLAY

BACKGROUND OF THE INVENTION

1. Field of the Invention

The present invention relates to a method and an apparatus for stereoscopic image display and, in particular, relates to a method and an apparatus for stereoscopic image display with which an observer can observe a stereoscopic image without wearing special spectacles and which are preferred for displaying a stereoscopic image in a television, a video camera, a computer, a game machine or the like.

2. Related Background Art

Conventionally, the parallax barrier method and the lenticular method are known as methods of performing stereoscopic image display on an image displaying device such as a CRT or an LCD. With these methods, a stereoscopic image is displayed by displaying a synthesized stripe parallax image in which parallax images of two or more viewpoints, which are divided in a stripe pattern, are arranged alternately in a predetermined order, and guiding display light from the parallax image only to a viewpoint position corresponding to the parallax image in an optical member disposed in the front of the image displaying device. In addition, a method and an apparatus for stereoscopic image display is proposed in, for example, Japanese Patent Application Laid-Open No. 9-311294 which is characterized by transmitting light from an illumination light source through an optical modulator having a predetermined light transmitting section and a light shielding section and patterning the transmitted luminous flux, giving the patterned luminous flux directivity by a patterned optical system such that it becomes incident on the right and the left eyes of an observer separately, providing an image displaying device of a transmitting type between the patterned optical system and the observer, and synthesizing parallax images corresponding to the right and the left eyes alternately in a stripe pattern on the image displaying device to display.

In the parallax barrier method and the lenticular method, a vertical stripe synthesized parallax image in which long and narrow parallax images are alternately displayed in the vertical direction is used as a synthesized stripe parallax image. Orientation to a viewpoint of the parallax image is performed by a pixel position of the vertical stripe image and a parallax barrier or a lenticular lens placed in the front of an image displaying device. When an image displaying device having discrete pixels such as a CRT, an LCD or a PDP is used as an image displaying device in these methods, a dark part to which display light does not reach is generated on an observation surface corresponding to a part of a so-called black matrix existing between the pixels, and a width in the horizontal direction of an effective observation region is narrowed.

In the method proposed in Japanese Patent Application Laid-Open No. 9-311294, a transmitting type image displaying device such as an LCD is used as an image displaying device, and orientation of display light to a position of the left and the right eyes is performed by an optical system placed behind the image displaying device. This method has a problem such as cross talk that occurs when a direction of display light is disarranged by diffusion of a transmitting type image displaying device such as an LCD or diffraction due to a pixel structure.

In addition, in these conventional stereoscopic image displaying methods without spectacles, there is another problem in that the number of display pixels are halved when parallax images for each of the left and the right eyes are displayed, and resolution is decreased.

SUMMARY OF THE INVENTION

The present invention has been devised in view of the above and other drawbacks, and it is an object of the present invention to provide a stereoscopic image displaying method and an apparatus using the same, which are capable of displaying a stereoscopic image with high resolution by reducing cross talk and moiré, or are capable of displaying an image in which a stereoscopic image and a plane image are mixed if necessary or displaying a plane image with high resolution without flicker as well in a display apparatus when a stereoscopic image is observed without requiring special spectacles.

In order to solve the above-mentioned object, a stereoscopic image displaying method in accordance with one aspect of the present invention is characterized in that, when image information displayed on an image displaying device is observed three-dimensionally by guiding display light from an image corresponding to a viewpoint of one parallax image on the image displaying device, on which parallax images corresponding to a plurality of different viewpoints can be displayed, to an optical modulator, on which a light transmitting section and a light shielding section can be formed, by a second optical system disposed in the front of the image displaying device, and collecting the display light transmitted through the light transmitting section of the optical modulator at a position, which is a predetermined distance apart, corresponding to the viewpoint on an observation surface, by a first optical system, the entire screen of a parallax image to be displayed on the image displaying device is caused to be incident on each eye by controlling transmitted light from the optical modulator in synchronism with the switching of parallax images to be displayed on the image displaying device.

In the above-mentioned method, a first synthesized parallax image in which one stripe image is synthesized by dividing two parallax images for the right and the left eyes into horizontal stripe pixels, respectively, and arranging horizontal stripe pixels for the left and the right eyes in a predetermined order, and a second synthesized parallax image that is an interpolation image of the first synthesized parallax image which is synthesized by changing its order of arrangement may be alternately displayed on the image displaying device.

In addition, in the above-mentioned method, the change of the synthesized parallax image to be displayed on the image displaying device and the control for forming the light transmitting section and the light shielding section may be performed synchronously for each pixel of the image displaying device or each scan line.

In addition, in the above-mentioned method, the optical modulator may use a liquid crystal shutter that has pixels of a matrix structure or an oblong pixel structure.

In addition, in the above-mentioned method, two parallax images for the right and the left eyes may be alternately displayed on the image displaying device.

In addition, in the above-mentioned method, the image displaying device may emit predetermined polarized light.

In addition, in the above-mentioned method, the optical modulator may have a first phase shift member for giving two different phase shift states to transmitted light by an electric signal and a polarized optical device for partially transmitting predetermined polarized light only, which is provided in a predetermined position to the front of the first phase shift member.

In addition, in the above-mentioned method, the polarized optical device may be configured by arranging two polarization plates on which optical axes are perpendicular to each other in a checkered pattern.

In addition, in the above-mentioned method, the polarized optical device may be configured by alternately arranging two polarization plates on which optical axes are perpendicular to each other in the horizontal direction in a stripe pattern that is long in the vertical direction.

In addition, in the above-mentioned method, the polarized optical device may comprise a second phase shift member and a polarizing plate, and its phase may be processed as 0 and π in a pattern in which the second phase shift member is arranged in a checkered pattern or a stripe pattern that is long in the vertical direction.

In addition, in the above-mentioned method, the optical modulator has a first phase shift member for giving two different phase shift states to transmitted light by an electric signal, and the first phase shift member may be arranged between the image displaying device and the second optical system.

In addition, in the above-mentioned method, the image displaying device may have a light emissive display apparatus and a polarizing plate.

In addition, in the above-mentioned method, a 2D image (an image without parallax) may be displayed on a part of or the entirety of the image displaying device.

In addition, in the above-mentioned method, the second optical system may focus an image of the image displaying device on the optical modulator in the vertical direction, and a focal point position of the second optical system and the position of the optical modulator may substantially coincide with each other in the horizontal direction.

In addition, in the above-mentioned method, the first optical system and the second optical system may have predetermined periodic structures in the horizontal direction, and the second optical system and/or the image displaying device may be disposed on a face on which a multiplicity of straight lines cross, which connect the left and the right pupils and the center in the horizontal direction of each optical element forming the first optical system.

In addition, in the above-mentioned method, the second optical system may have a predetermined periodic structure in the horizontal and vertical directions, respectively, and the optical element forming one period in the horizontal and vertical directions may have optical actions that are different in the horizontal direction and the vertical direction.

In addition, in the above-mentioned method, a crossing point of a multiplicity of straight lines that connect the left and the right pupils and the center in the horizontal direction of each optical element forming the first optical system, and the center in the horizontal direction of each optical element forming the second optical system may coincide with each other, and/or the center in the horizontal direction of pixels forming the image displaying device may coincide with them.

In addition, in the above-mentioned method, when the left and the right pupils are apart by an interval E, a period in the horizontal direction of the optical element forming the first optical system is HL1, a width in the horizontal direction of the light transmitting section of the optical modulator in Hm, a period in the horizontal direction of the optical element forming the second optical system is HL2, a pixel pitch in the horizontal direction of the image displaying device id Hd, optical distances between the first optical system and the second optical system and the first optical system and the image displaying device are LHL2 and Lhd, respectively, an optical distance from the observation surface to the first optical system is Lh0, an optical distance from a crossing face that is the first one counted from the first optical system in the direction to the image displaying device among faces on which a group of light beams connecting the left and the right pupils and each pixel of the image displaying device cross is Lh1, an optical distance from the first optical system to a crossing face that is the first one counted from the first system in the direction to the image displaying device is Lh1$b$, and both Nd and NL2 are integral numbers of 2 or more, the following relations may be realized:

$$Nd*HL1/E=Lhd/(Lhd+Lh0) \tag{h1}$$

$$Hd/HL1=(Lh0+Lhd)/Lh0 \tag{h2}$$

$$NL2*HL1/E=LhL2/(LhL2+Lh0) \tag{h3}$$

$$HL2/HL1=(Lh0+LhL2)/Lh0 \tag{h4}$$

$$H1/E=Lh1/(Lh1+Lh0) \tag{h5}$$

$$H1/HL1=(Lh1+Lh0)/Lh0 \tag{h6}$$

$$H1*Lh1a/Lh1=HL1*Lh1b/Lh1 \tag{h7}$$

$$Lh1a+Lh1b=Lh1 \tag{h8}$$

$$Hm/H1=Lh1a/Lh1 \tag{h9}$$

In addition, in the above-mentioned method, when a pixel pitch in the vertical direction of the image displaying device is Vd, a width in the vertical direction of the light transmitting section or the light shielding section of the optical modulator is Vm, an optical distance from the image displaying device to a face having the optical actions in the vertical direction of the second optical system is Lv1, an optical distance from a face having the optical actions in the vertical direction of the second optical system to the optical modulator is Lv2, a focal distance in the vertical direction of each optical element forming the second optical system is fv, and an optical distance between the optical modulator and the observation surface is Lv0, the following relations may be realized:

$$Vd:Vm=Lv1:Lv2 \tag{v1}$$

$$2 \cdot Vd:VL=Lv1+Lv2:Lv2 \tag{v2}$$

$$1/Lv1+1/Lv2=1/fv \tag{v3}$$

$$Vd:VL=Lv0+Lv1+Lv2:Lv0+Lv2 \tag{v4}$$

In addition, in the above-mentioned method, the first and the second optical systems may have lenticular lenses.

In addition, a stereoscopic image displaying method in accordance with another embodiment of the present invention is characterized in that each of the parallax images corresponding to a plurality of different viewpoints is made a predetermined stripe image, display light, which is from a stripe image corresponding to one viewpoint of a synthesized parallax image on an image displaying device that can alternately display a synthesized parallax image in which the stripe images are arranged in a predetermined order and synthesized, and a synthesized parallax image in which the arrangement is changed, is guided to an optical modulator, which is formed in synchronism with the change of a synthesized parallax image that displays a predetermined pitch of light transmitting section and light shielding section by a second optical system disposed in the front of the image displaying device, display light that has transmitted through the light transmitting section of the optical modulator, are collected at a position corresponding to a viewpoint on an observation face by a first optical system, and three-dimensional observation of image information displayed on the image displaying device is thereby performed.

In the above-mentioned method, display light reaching a viewpoint position of an observer which corresponds to the stripe image among the display light emitted from pixels forming each of the stripe images may be collected in the optical modulator so as to be transmitted through the light transmitting section of the optical modulator by the second optical system, and the other light may be shielded by the light shielding section.

In addition, in the above-mentioned method, the second optical system may focus an image of pixels of the image displaying device on the optical modulator in the vertical direction, and a focal point position and the position of the optical modulator may substantially coincide with each other in the horizontal direction.

Moreover, as another aspect of the present invention, a stereoscopic image displaying apparatus may be established which is characterized by using the above-mentioned method.

BRIEF DESCRIPTION OF THE DRAWINGS

FIG. 7 is an explanatory view of control states of a parallax image and an optical modulator of the first embodiment of the present invention;

FIG. 8 is an explanatory view of control states of a parallax image and an optical modulator of the first embodiment of the present invention;

FIG. 9 is an explanatory view of control states of a parallax image and an optical modulator of the first embodiment of the present invention;

FIG. 10 is an explanatory view of control states of a parallax image and an optical modulator of the first embodiment of the present invention;

FIG. 11 is an explanatory view of control states of a parallax image and an optical modulator of the first embodiment of the present invention;

DESCRIPTION OF THE PREFERRED EMBODIMENTS

A method and an apparatus for stereoscopic image displaying in accordance with the present invention will be hereinafter described based on preferred embodiments shown in accompanying drawings.

(First Embodiment)

Figure 1:
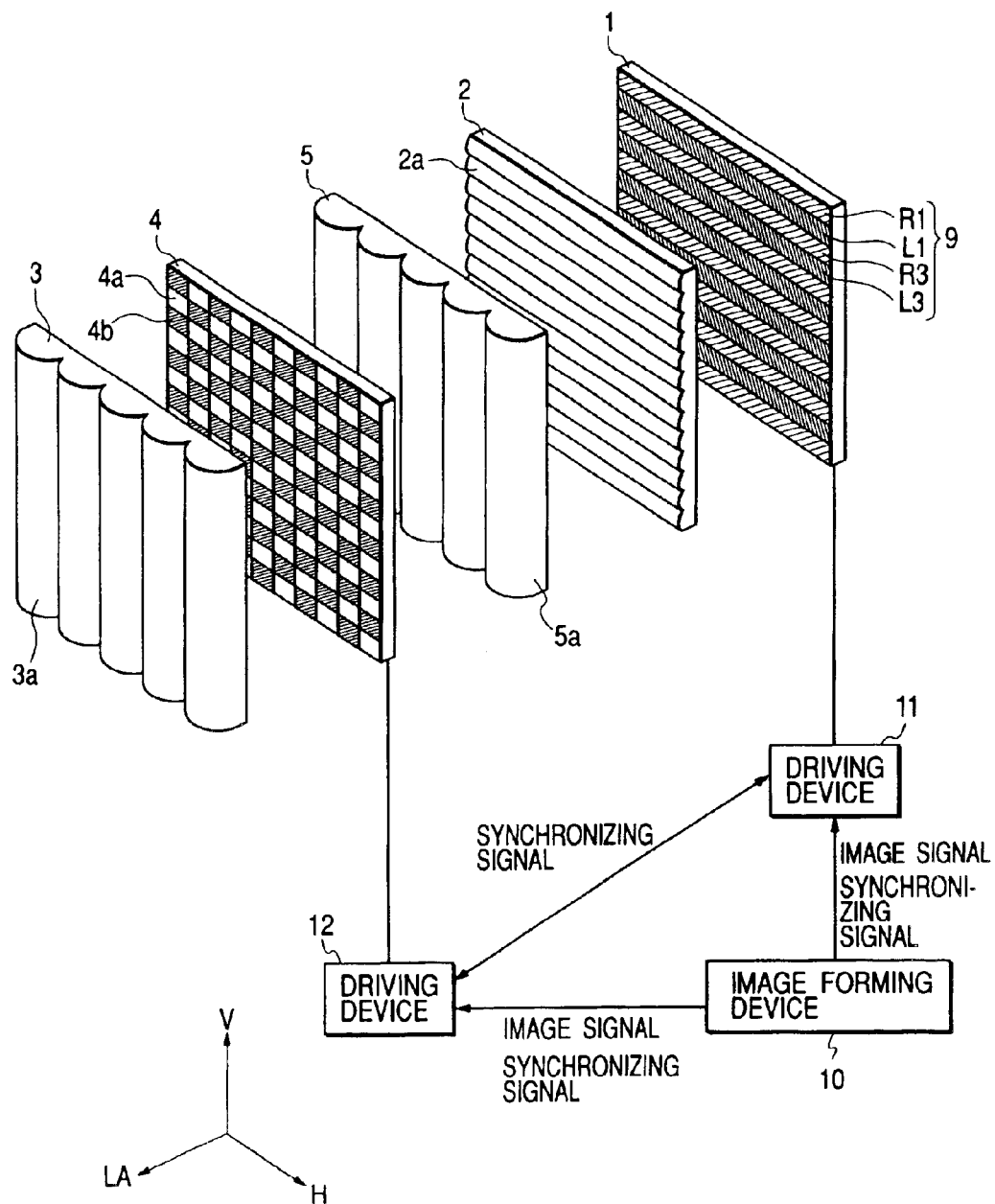
FIG. 1 is a perspective view showing a first embodiment of the present invention.

FIG. 1 is a main part perspective view illustrating an image displaying state at a certain instance in a first embodiment of the present invention. Two pieces (a plurality) of synthesized parallax images that are synthesized from parallax images of two viewpoints (or two or more viewpoints) to be described later are alternately displayed on an image displaying device 1. Reference numeral 2 denotes a horizontal lenticular lens, which has a plurality of cylindrical lenses (optical elements) 2a having a refraction power in the vertical direction V. Reference numeral 3 denotes a first vertical lenticular lens (first optical system), reference numeral 4 denotes an optical modulator that is capable of controlling a light shielding section and a light transmitting section with respect to predetermined polarized light, and reference numeral 5 denotes a vertical lenticular lens (second optical system). The first and the second vertical lenticular lenses 3 and 5 have a plurality of cylindrical lenses (optical elements) 3a and 5a, respectively, having a refraction power to the horizontal direction H.

FIGS. 2A to 2D are explanatory views of the synthesized parallax image displayed on the image displaying device 1.

Figure 2A:
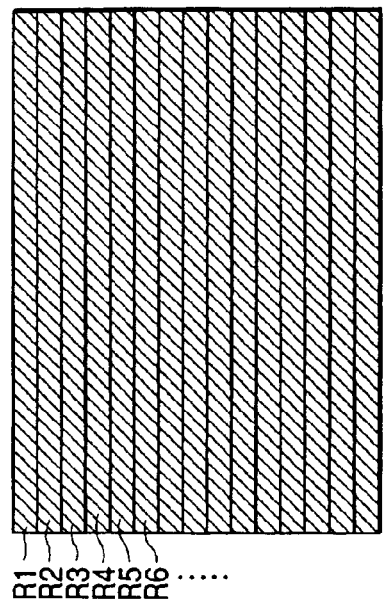
FIGS. 2A, 2B, 2C and 2D are explanatory views of a synthesized parallax image to be displayed on an image displaying device of the first embodiment of the present invention.
Figure 2B:
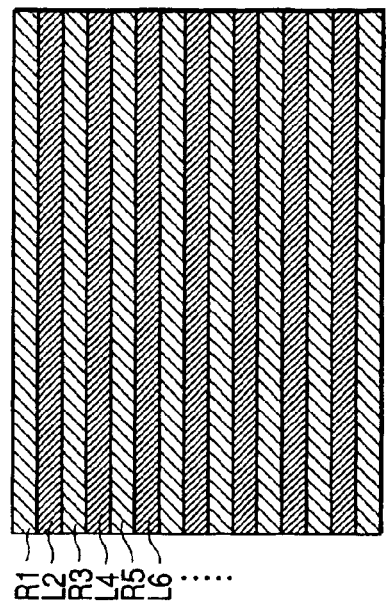

FIG. 2A is a parallax image 6 for the left eye, and FIG. 2B is a parallax image 7 for the right eye. A synthesized parallax image 8 shown in FIG. 2C or a synthesized parallax image 9 shown in FIG. 2D are synthesized by dividing the parallax images 6 and 7 that correspond to the left and the right eyes of an observer, respectively, into stripe images (L1 to Ln, R1 to Rn) that are long in the horizontal direction and alternately arranging them in the vertical direction. In this embodiment, the division into the horizontal stripe images is the division for each horizontal scan line of the image displaying device 1 (FIG. 1, etc.).

Figure 3:
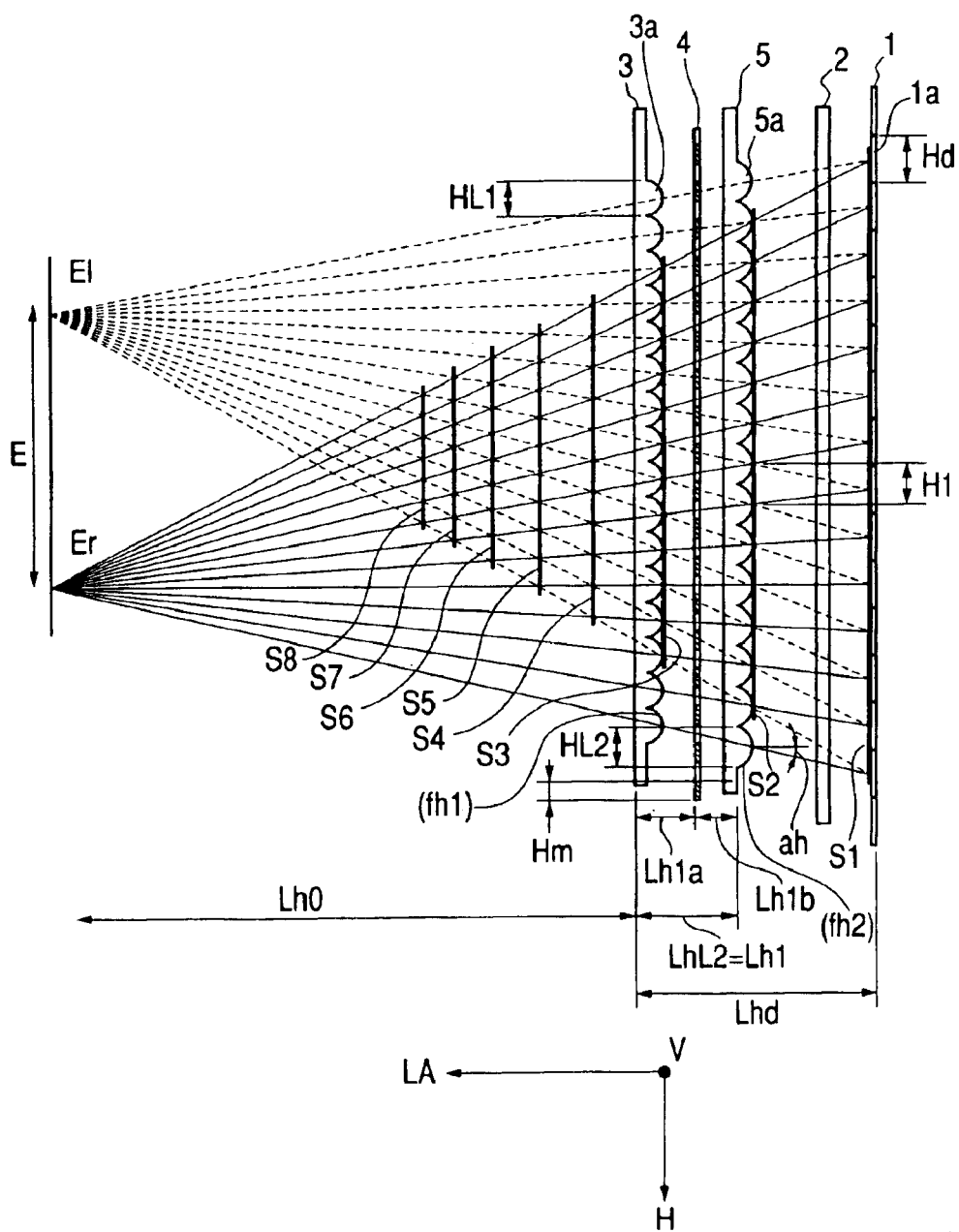
FIG. 3 is a horizontal sectional view for illustrating actions in the horizontal direction in the first embodiment of the present invention.
Figure 4:
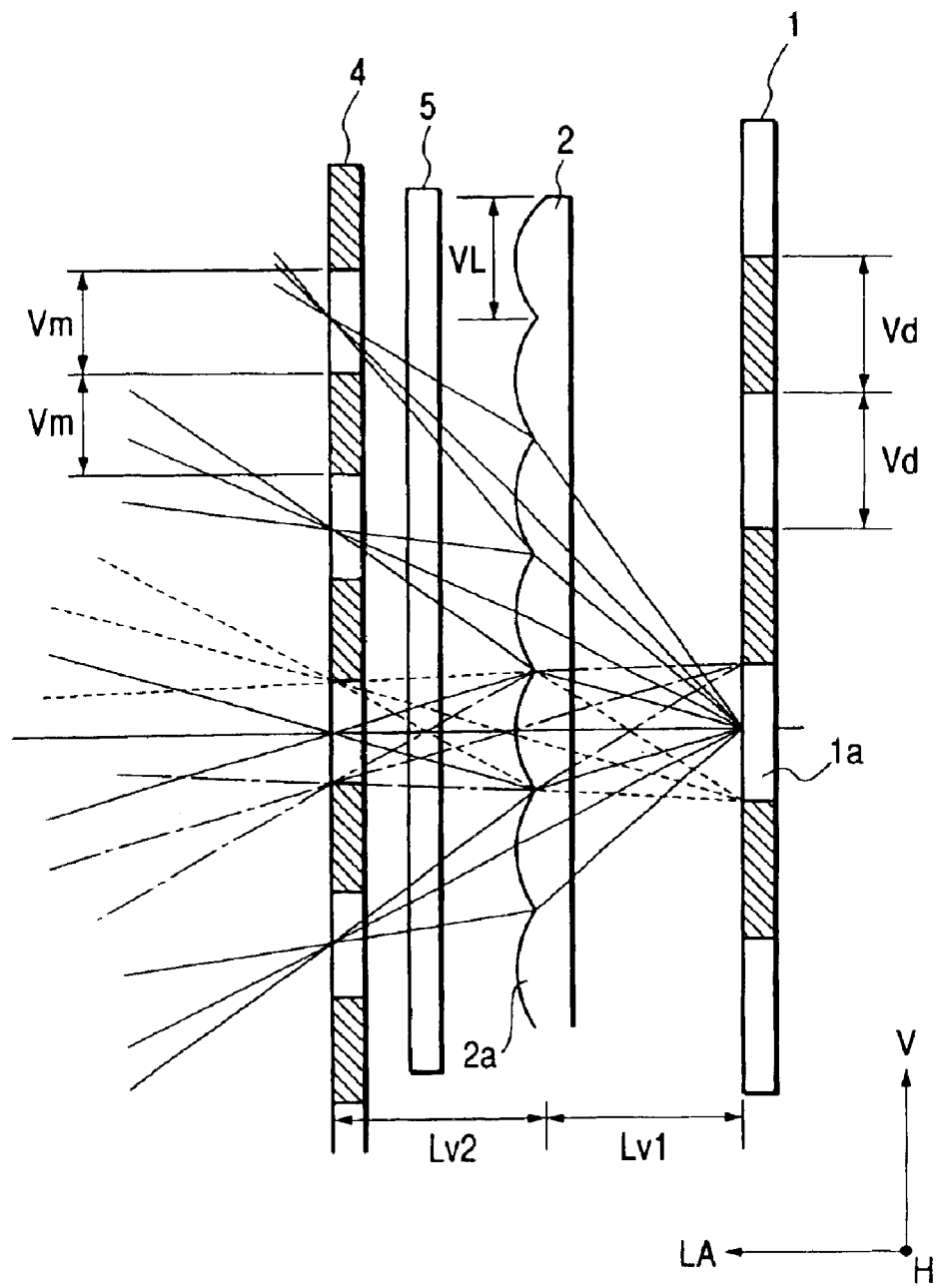
FIG. 4 is a vertical sectional view for illustrating actions in the vertical direction in the first embodiment of the present invention.

FIG. 3 is an H-LA sectional view (horizontal sectional view) of FIG. 1, and FIG. 4 is a V-LA sectional view (vertical sectional view) of FIG. 1.

A principle with which a stereoscopic image can be observed in a stereoscopic image displaying apparatus of the present invention will be described first, and then a method of displaying a stereoscopic image of high resolution will be described.

It is assumed that the second synthesized parallax image 9 in which odd number lines of the synthesized parallax image are parallax images for the right eye (R1, R3, R5, ...) and even number lines are parallax images for the left eye (L2, L4, L6, ...) is displayed in the state of the first embodiment shown in FIG. 1. In FIG. 1, one cylindrical lens 2a, which forms the horizontal lenticular lens 2, which is oblong in the horizontal direction and has a curvature in the vertical direction only, corresponds to each pixel horizontal line of the synthesized parallax image 9 to be displayed on the image displaying device 1, and a pixel 1a of the image displaying device 1 focuses an image on the optical modulator 4 in a vertical cross section (in a V-LA cross section).

In the horizontal direction (in an H-LA cross section), image displaying light that is emitted from each pixel of the image displaying device 1 is collected on the optical modulator 4 by the second vertical lenticular lens 5. The optical modulator 4 is disposed on a focal point face of the cylindrical lens 5a which forms the second vertical lenticular lens 5, which is oblong in the vertical direction and has a curvature in the horizontal direction only.

When the focal distance of the cylindrical lens 5a forming the second vertical lenticular lens 5 is fh2, image displaying light from each pixel 1a crosses the optical modulator 4 at a position that is shifted in the horizontal direction by fh2*tan(ah) from the center of each cylindrical lens 5a with respect to an incident angle ah in the horizontal direction to the cylindrical lens 5a.

One line in the horizontal direction of the light transmitting section 4a and the light shielding section 4b of the optical modulator 4 corresponds to one horizontal line of the synthesized parallax image, and a pair of one light transmitting section and one light shielding section correspond to one of the cylindrical lenses 3a forming the first vertical lenticular lens 3 in the horizontal direction.

An arrangement of the light transmitting section 4a and the light shielding section 4b in a horizontal line of the optical modulator 4 is defined such that, among the image displaying light from each pixel of lines for the right eye (odd number scan lines) of the synthesized parallax image 9, image displaying light directing to a position of the right eye Er of an observer is collected onto the light transmitting section 4a of the optical modulator 4 by the second vertical lenticular lens 5 and the image displaying light directing to a position of the left eye El of the observer is shielded by the light shielding section 4b of the optical modulator 4. An arrangement of the light transmitting section 4a and the light shielding section 4b in horizontal odd number lines of the optical modulator 4 is set such that positions of the light transmitting section 4a and the light shielding section 4b changes with an arrangement of a light transmitting section and a light shielding section in horizontal even number lines, and the overall light transmitting sections and light shielding sections is made to be checkered pattern like.

The image displaying light transmitted through the optical modulator 4 is projected to the left and the right eyes of the observer by the first vertical lenticular lens 3. Since the optical modulator 4 is a focal point face of the first vertical lenticular lens 3, only displaying light from a parallax image for the left eye reaches the left eye and only displaying light from a parallax image for the right eye reaches the right eye of an observer in a distance defined in advance by the position of the light transmitting section of the optical modulator 4 and the first vertical lenticular lens 3.

A mutual relationship of the first vertical lenticular lens 3, the horizontal lenticular lens 2, the optical modulator 4 and the second vertical lenticular lens 5 will now be described in the case in which design parameters of a stereoscopic image displaying apparatus using them are preferably set.

FIG. 3 is a sectional view of the stereoscopic image displaying apparatus of this embodiment taken away on a horizontal cross section (H-LA cross section) including image lines (odd number scan line) for the right eye of the image displaying device 1, in which identical reference numerals are given to the members identical with those in the figures already referred to. In the stereoscopic image displaying apparatus of the present invention, optical actions in the horizontal direction and optical actions in the vertical directions can be considered separately, and the description with reference to FIG. 3 relates to optical actions in the horizontal direction.

In FIG. 3, the image displaying light directing to the right eye Er is shown by solid lines and the image displaying light directing to the left eye El is shown by broken lines. As is evident from FIG. 1 and FIGS. 2A to 2D, a face including these two groups of light is shifted to the vertical direction by a width of a scan line of the image displaying device 1.

In this embodiment, it is desirable to configure the stereoscopic image displaying apparatus such that a vertex of the cylindrical lens 3a forming the first vertical lenticular lens 3, the center of the light transmitting section or the light shielding section of the optical modulator 4, or a vertex of the cylindrical lens 5a forming the second vertical lenticular lens 5 is positioned on a point on which a plurality of straight lines connecting the positions of the left and the right pupils of the observer and each pixel on the horizontal pixel line of the image displaying device 1 cross. Even if this condition is not satisfied, as long as the relationship between the optical modulator 4 and the first lenticular lens 3 is maintained a stereoscopic image can be displayed, but it is possible that utilization efficiency of the light from the image displaying apparatus 1 gets worse and a part of the pixels are dark depending on the arrangement.

When the stereoscopic image displaying apparatus is configured as shown in FIG. 3, it is sufficient to arrange the first vertical lenticular lens 3 and the second vertical lenticular lens 5 on faces (crossing faces) S1, S2 . . . , Sn on which a group of straight lines connecting the two points El and Er that are positions of the left and the right eyes and each pixel on the horizontal pixel line of the image displaying device cross.

In FIG. 3, the second vertical lenticular lens 5 is arranged on a crossing face S2 that is the first crossing face from the first vertical lenticular lens 3, and the image displaying device 1 is arranged on a second crossing face S1. The horizontal lenticular lens 2 can be arranged at a position where it does not interfere with the other members if a condition in the vertical direction to be described later is satisfied without regard to these conditions. (In FIG. 3, the horizontal lenticular lens 2 is arranged between the image displaying device 1 and the second vertical lenticular lens 5.)

The optical modulator 4 is arranged on a face between the first vertical lenticular lens 3 and the second vertical lenticular lens 5, which makes an interval between a group of straight lines (broken lines) connecting the left eye and each pixel 1a of the image displaying device 1 and an interval between a group of straight lines (solid lines) connecting the right eye and each pixel of the image displaying device 1 equal. When the first vertical lenticular lens 3, the horizontal lenticular lens 2, the optical modulator 4 and the second vertical lenticular lens 5 are arranged as described above, the relationship between design parameters relating to the horizontal direction of the stereoscopic image displaying apparatus of this embodiment is as follows:

$$Nd*HL1/E = Lhd/(Lhd+Lh0) \tag{h1}$$

$$Hd/HL1 = (Lh0+Lhd)/Lh0 \tag{h2}$$

$$NL2*HL1/E = LhL2/(LhL2+Lh0) \tag{h3}$$

$$HL2/HL1 = (Lh+LhL2)/Lh0 \tag{h4}$$

$$HL2/E = Lh1/(Lh1+Lh0) \tag{h5}$$

$$H1/HL2 = (Lh0+Lh1)/Lh0 \tag{h6}$$

$$H1*Lh1a/Lh1 = H0*Lh1b/Lh1 \tag{h7}$$

$$Lh1a+Lh1b = Lh1 \tag{h8}$$

$$Hm/H1 = Lh1a/Lh1 \tag{h9}$$

$$fh2 = LhL2 - Lh1a \tag{h10}$$

$$fh1 = Lh1a \tag{h11}$$

Here, HL1 and HL2 are pitches of cylindrical lenses of the first and the second vertical lenticular lenses 3 and 5, Hd is a pixel pitch in the horizontal direction of the image displaying device 1, Hm is a width in the horizontal direction of the light transmitting section 4a or the light shielding section 4b of the optical modulator 4, H1 is a horizontal pitch between crossing points of the first crossing face S2 of the above-mentioned group of light beams from the first vertical lenticular lens 3, Nd and NL2 are positive integral numbers indicating that the image displaying device 1 and the second vertical lenticular lens 5 are positioned on an Ndth crossing face and an NL2th crossing face of the above-mentioned group of light beams from the first vertical lenticular lens 3, respectively. Lhd and LhL2 are optical distances from the first vertical lenticular lens 3 to the second vertical lenticular lens 5 and the image displaying device 1, respectively, Lh0 is an optical distance from the observer to the first vertical lenticular lens 3, Lh1 is a distance from the observer to the first crossing face of the above-mentioned group of light beams from the first vertical lenticular lens 3, Lh1a and Lh1b are an optical distance from the first crossing face to the optical modulator 4 and an optical distance from the optical modulator 4 to the second crossing face, respectively, and fh1 and fh2 are focal distances of cylindrical lenses 3a and 5a forming the first and the second vertical lenticular lenses 3 and 5, respectively. If each design parameter satisfies these relations, good separation of displaying light occurs in the right and the left eyes.

Here, although the second vertical lenticular lens 5 is arranged on the first crossing face S2 in the embodiment shown in FIG. 3, the relations (h6) to (h9) are required to be realized irrespective of whether or not the second vertical lenticular lens 5 is arranged on the first crossing face. Further, equations (h1) to (h11) do not need be realized strictly, but may be substantially equal (within ±20%). This is true for each of the other equations.

Figure 27:
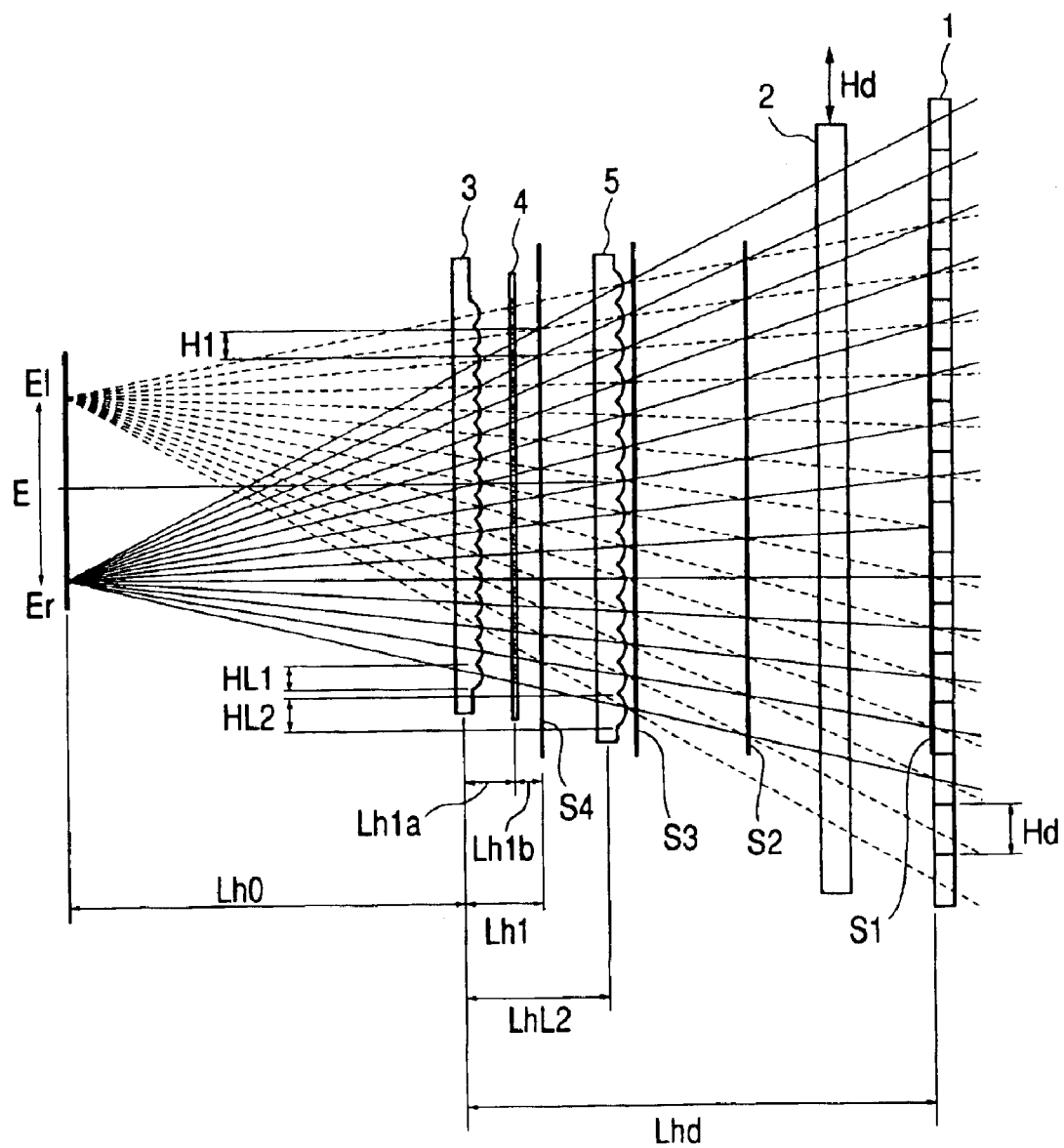
FIG. 27 is a view showing another configuration of the first embodiment of the present invention.

FIG. 27 shows an example of configuration in which the image displaying device 1 and the second vertical lenticular lens 5 are arranged on the fourth crossing face S1 and the second crossing face S3 of the above-mentioned group of light beams from the first vertical lenticular lens 3 (in the case Nd=4 and NL2=2). Identical reference numerals are given to members that are identical with those in FIG. 3. In this example of configuration, displaying light also separated well in the right and the left eyes if the above-mentioned relations (h1) to (h9) are realized.

In this way, in this embodiment, since there is a degree of freedom at the positions where the second vertical lenticular lens 5 and the image displaying device 1 are arranged, there is a configuration in which a stereoscopic image can be displayed well even if, for example, the image displaying device 1 is such as an LCD or a PDP, and a liquid crystal layer or the like on which images are actually displayed are sandwiched by a predetermined thickness of a substrate glass or the like, or a member such as the second vertical lenticular lens 5 and the horizontal lenticular lens 2 cannot be arranged in the immediate vicinity of the image displaying device 1.

Further, if the utilization efficiency of image light from the image displaying device 1 needs not be set high, a stereoscopic image can be displayed even if the above-mentioned relations are not always satisfied or a part of them are satisfied. In this case, it is sufficient that Hm:E=Lh1a:Lh0 and the above-mentioned (h11) and a relation in the vertical direction to be described later are satisfied.

A relation in the vertical direction (V-LA cross section) in this embodiment will now be described with reference to FIG. 4.

FIG. 4 is a schematic illustration of the stereoscopic image display apparatus of this embodiment viewed from its side, and identical reference numerals are given to the members identical with those in the figures already referred to. The individual cylindrical lens 2a forming the horizontal lenticular lens 2 corresponds to one horizontal line of the image displaying device 1, and focuses an image of the horizontal line on one horizontal line composed of the light transmitting section 4a and the light shielding section 4b on the optical modulator 4 in a vertical cross section. In order for such an action to work well, a relationship of design parameters relating to the vertical direction of the stereoscopic image displaying apparatus are as shown below.

$$Vd:Vm = Lv1:Lv2 \tag{v1}$$

$$2 \cdot Vd:VL = Lv1+Lv2:Lv2 \tag{v2}$$

$$1/Lv1 + 1/Lv2 = 1/fv \tag{v3}$$

Here, Vd is a vertical direction pitch of a pixel of the image displaying device 1, Vm is a width in the vertical direction of the light transmitting section 4a or the light shielding section 4b of the optical modulator 4, Lv1 is an optical distance from the image displaying device 1 to the horizontal lenticular lens 2, Lv2 is an optical distance from the horizontal lenticular lens 2 to the optical modulator 4, and fv is a focal point distance of the cylindrical lens 2a forming the horizontal lenticular lens 2.

The equation (v1) is a condition for one horizontal stripe image on the image displaying device 1 to be formed on one horizontal line on the optical modulator 4 with a just sufficiently enough width, and the equation (v3) is a condition defining a focal point length in the vertical direction of an individual cylindrical lens 2a that is elongated in the horizontal direction forming the horizontal lenticular lens 2 that is required for forming the image. The equation (v2) is a condition for reversion of the left and the right not occurring and cross talk not being generated even if image light emitted from one horizontal stripe image on the image displaying device passes through the cylindrical lens 2a elongated in the horizontal direction which does not correspond to the horizontal stripe image of the horizontal lenticular lens 2.

Moreover, with the configuration in which the observer's eyes, the center of each light transmitting section of the optical modulator 4, the center of the individual cylindrical lens 2a forming the horizontal lenticular lens 2 and the center of the pixel 1a of the image displaying device 1 are arranged on one straight line, utilization efficiency of image light can be increased and lateral strips of the horizontal lenticular lens 2 can be made less conspicuous.

In order to configure the stereoscopic image displaying apparatus in this way, it is necessary to realize an equation shown below when an optical distance from the optical modulator 4 to the observer is $Lv0$ in addition to the equation (v1) to the equation (v3).

$$Vd:VL=Lv0+Lv1+Lv2:Lv0+Lv2 \qquad (v4)$$

As described before, the relations in the vertical direction and the horizontal direction are independent in this embodiment, and the horizontal lenticular lens 2 can be freely arranged in the position where the equation (v1) to the equation (v4) are realized and the horizontal lenticular lens 2 does not interfere with the other members.

Figure 2C:
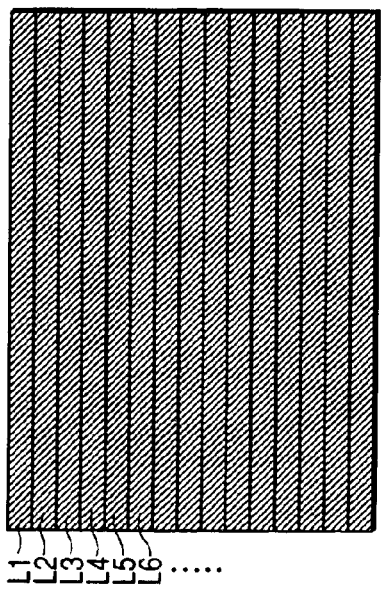
Figure 2D:
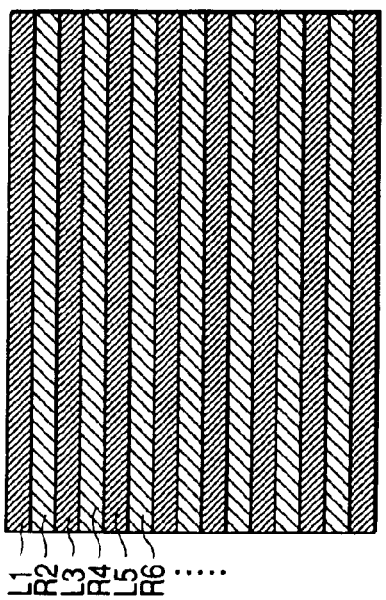

In this way, in the stereoscopic image displaying apparatus of this embodiment, if the synthesized parallax image 8 or 9 in the horizontal stripe pattern shown in FIGS. 2C or 2D is displayed on the image displaying device 1, each of the parallax images 6 and 7 can be observed in a predetermined observation position and a stereoscopic image can be observed well.

A method of displaying a stereoscopic image of high resolution will now be described with reference to FIGS. 1, 2A to 2D, 5 and 6.

An image forming device 10 shown in FIG. 1 generates a synthesized parallax image to be displayed on an image displaying device 1, and at the same time, determines the positions of the light transmitting section 4a and the light shielding section 4b in a checkered pattern of the optical modulator 4 to generate and output a control signal in synchronism with an image signal. This control signal and the image signal of the synthesized parallax image are controlled to drive in synchronism each other by a unit of one pixel or one scan line of the image displaying device 1 and the optical modulator 4. (This will be described in detail later.)

Figure 5:
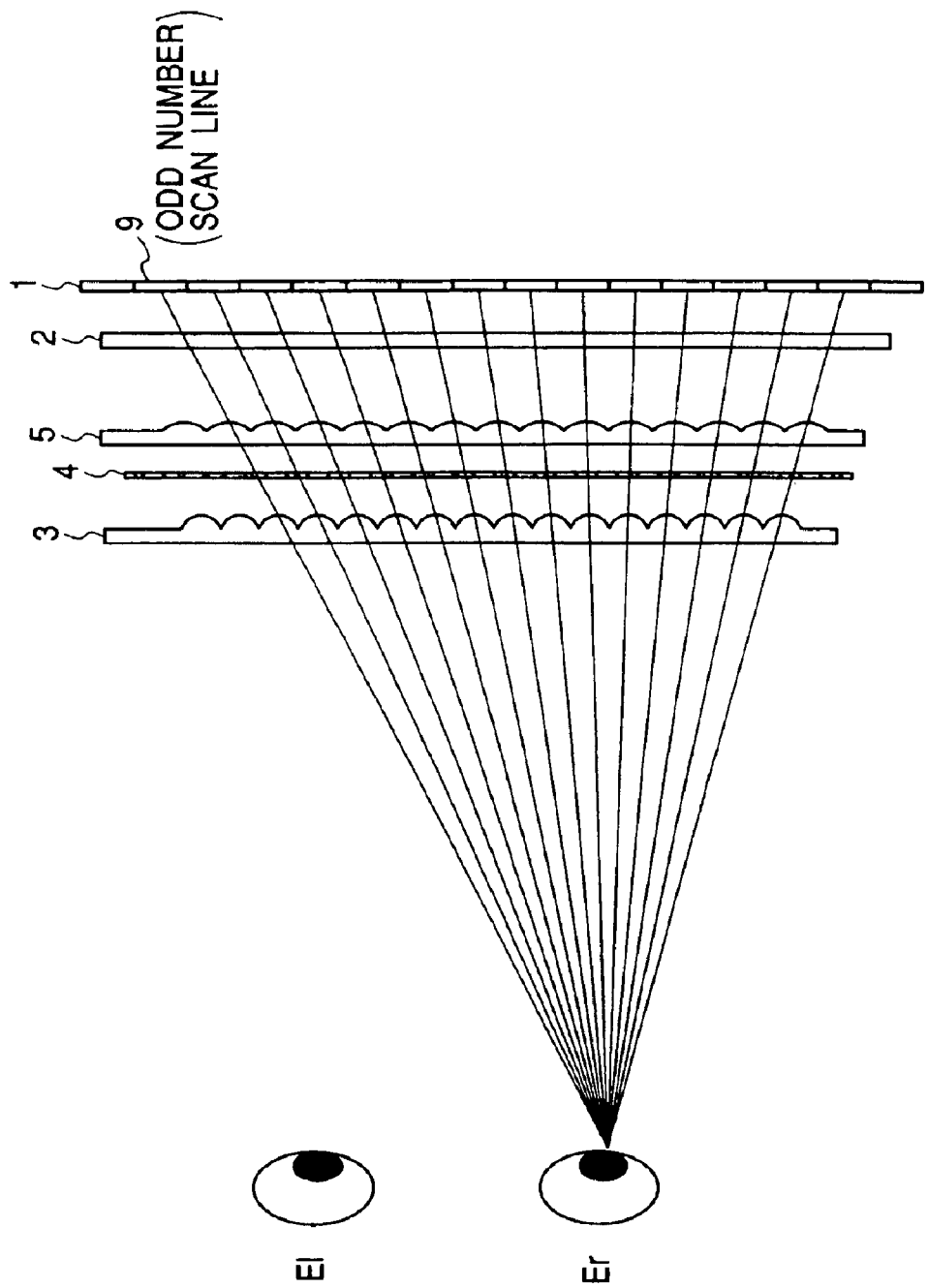
FIG. 5 is a horizontal sectional view for illustrating a displaying method of the first embodiment of the present invention.

FIG. 5 is a sectional view of a horizontal cross section of the image forming device 10 including an image line for the right eye (odd number scan line 8) at an instance when the synthesized parallax image 9 is displayed on the image displaying device 1, which is the same as a view showing only image light directing to the right eye as shown with solid lines in FIG. 3. FIG. 7 shows a display state (synthesized parallax image 9) of the image displaying device 1 and a pattern 14 of the light transmitting section 4a and the light shielding section 4b in a checkered pattern of the optical modulator 4. Therefore, at the time of such a display state, all images for the right eye displayed on the odd number scan line are caused to become incident on the right eye, and all images for the left eye that are shifted by one scan line are caused to become incident on the left eye. That is, at this point, a resolution in the horizontal direction of the image displaying device 1 is ½ for each eye.

The image forming device 10 then displays a synthesized parallax image 8 on the image displaying device 1, and controls the optical modulator 4 to form a checkered pattern in which the positions of the light transmitting section 4a and the light shielding section 4b shown in FIG. 5 are reversed.

Figure 6:
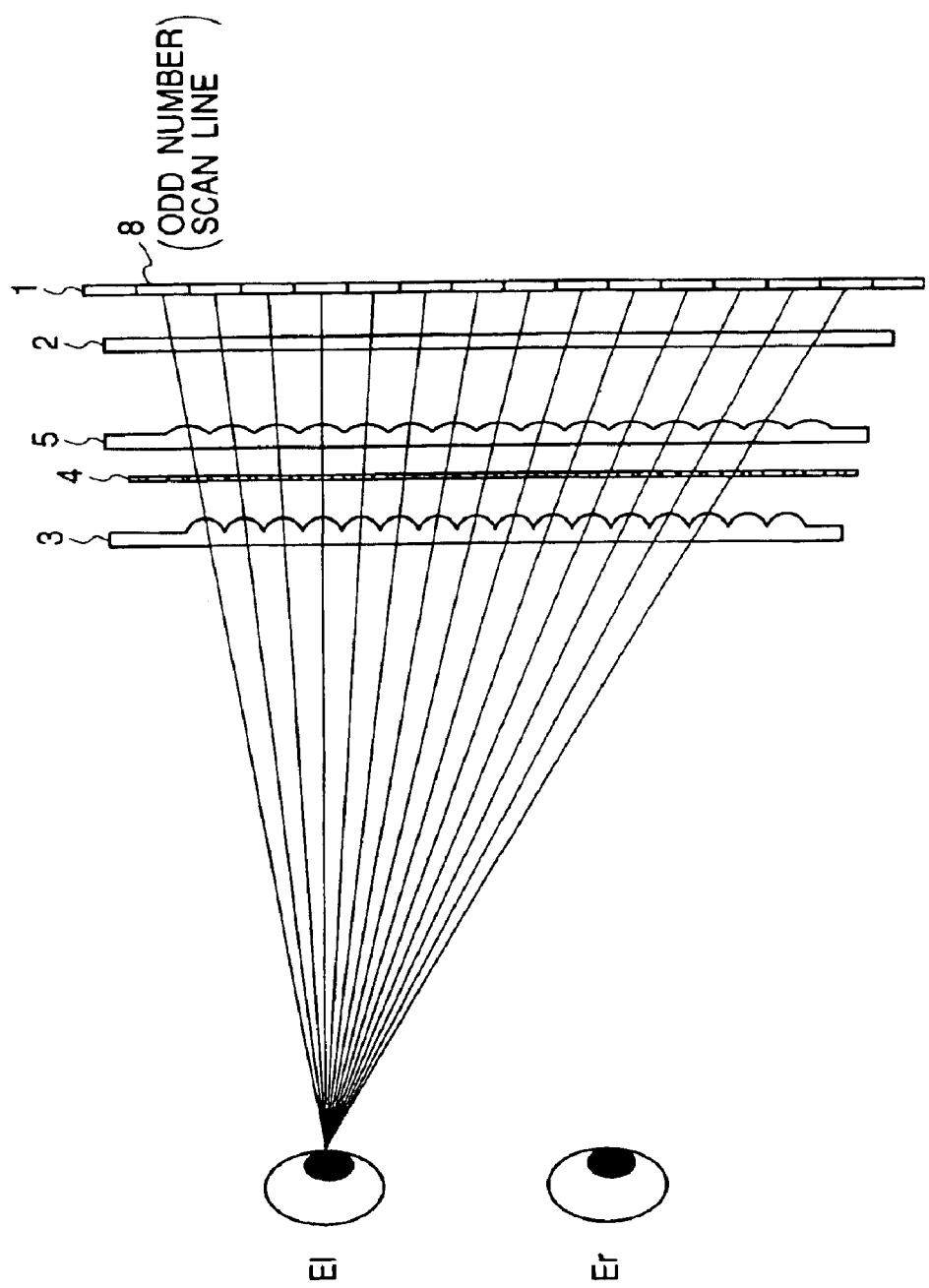
FIG. 6 is a horizontal sectional view for illustrating the displaying method of the first embodiment of the present invention.

That is, the image forming device 10 displays the synthesized parallax image 8 on the image displaying device 1 as shown in FIGS. 6 and 9, and displays a pattern 15 shown in FIG. 9 on the optical modulator 4. At this point, each of the parallax images is also incident on each eye in accordance with the aforementioned principle. However, as is evident from the drawings, the synthesized parallax image 8 is an interpolation image of the synthesized parallax image 9, and the checkered patterns 14 and 15 on the optical modulator 4 also interpolate each other. That is, an observer observes all of the respective parallax images displayed on the image displaying device 1 by alternately displaying these two states, and a stereoscopic image of high resolution can be observed.

Here, FIG. 8 shows a state in the middle of these two states, that is, a state in which a display is changing from FIG. 7 to FIG. 9. The image forming device 10 causes the image displaying device 1 and the optical modulator 4 to display and control the image to be in synchronism with each other with respect to pixels P associated with each other on a scan line. Usually, many image displaying devices are devices for displaying an image by selecting a scan line and sending image data on the scan line, for example, devices for displaying one after another from a first scan line in non-interlace.

In this embodiment, a stereoscopic image can be observed without causing cross talk in the left and the right eyes even if such a device is used. Even if a displaying device and an optical modulator with a low frame rate is used, an excellent stereoscopic image display is possible by displaying associated pixels on associated scan lines of the image displaying device 1 and the optical modulator 4 in synchronism with each other for each pixel or each scan line in this way.

Naturally, if a frame rate is high enough and a device that can drive at, for example, 120 Hz can be used, it is sufficient to switch at a high speed the two states shown in the above-mentioned FIGS. 5 and 7 and FIGS. 6 and 9. It is also desirable to display an image by synchronizing the devices with each other utilizing a vertical synchronizing signal of each device at this time.

In addition, the stereoscopic image displaying apparatus of this embodiment uses a stereoscopic image displaying method that can display a mixed image of a stereophonic image and a plane image with high resolution, or that can display a plane image with high resolution without flicker.

FIGS. 10 and 11 show a synthesized parallax image to be displayed on the image displaying device 1 and a checkered pattern on the optical modulator 4 when a mix of an stereoscopic image and a plane image (2D image) is displayed. The image is displayed by synchronizing for one pixel, one scan line or one frame as described before, although a display state in the middle is omitted here for simplicity of the description. Parts of FIGS. 10 and 11 are the same as FIGS. 7 and 9, which synthesize and display normal plane images (2D images) at predetermined positions of the synthesized parallax images 9 and 8.

That is, in the aforementioned state (the state in which a plane image is displayed using the synthesized parallax images 8 and 9 of a horizontal stripe pattern), an observer can observe a mixed image of a stereoscopic image and a plane image (2D image) displayed with high resolution on a same screen. This is because, since an observer can observe all faces of each parallax image by each eye, if a normal plane image (2D image) is synthesized and displayed at a predetermined position of the image displaying device 1, all pixels of this plane image (2D image) are incident on each eye, thus, a plane image (2D image) is seen by both the eyes without any parallax, and in the other positions, parallax images corresponding to each eye are separately displayed.

(Second Embodiment)

Figure 12:
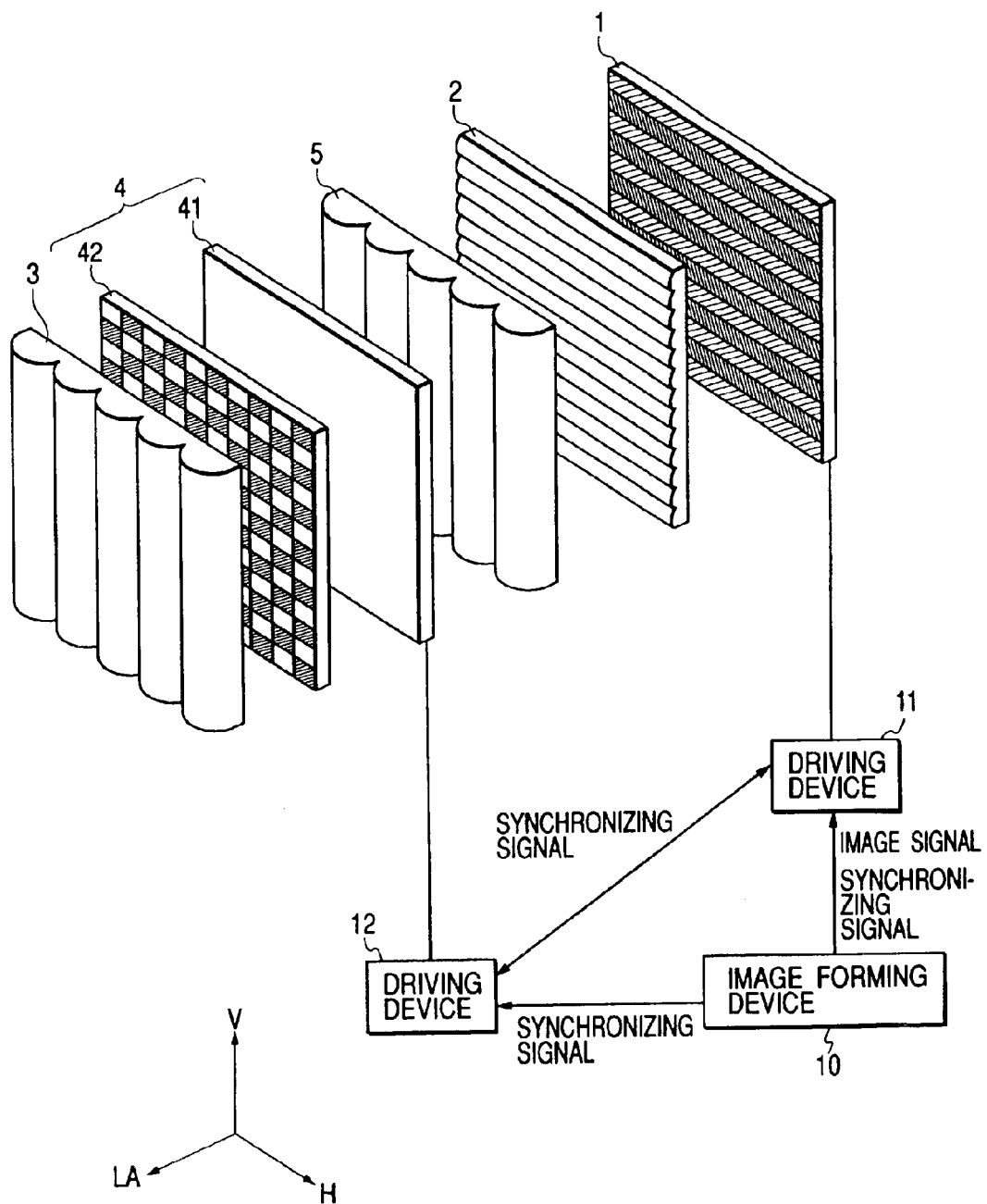
FIG. 12 is a perspective view showing a second embodiment of the present invention.

FIG. 12 illustrates a second embodiment of the present invention, in which identical reference numerals are given to the members identical with those in the figures already referred to. This embodiment is different from the first embodiment in that the optical modulator 4 has a first phase shift member 41 that gives transmitted light two different phase shift states by an electric signal and a polarizing optical device 42. Here, this point will be described in detail.

The image displaying device 1 is configured such that light to be emitted will be linearly polarized light having a polarized face oscillating into a paper surface of the drawing. This can be realized by setting a polarization plate used in an LCD in a predetermined direction if the LCD is used in the image displaying device 1, and can be realized by disposing a polarization plate in the front of a displaying surface of an automatic light emission type displaying device such as a CRT and a PDP if such a device is used in the image displaying device 1.

Here, although polarized light that is emitted from the image displaying device 1 is described as linearly polarized light that vibrates in a vertical direction with respect to a paper surface of the drawing for simplicity of description, even direct polarized light slanting 45 degrees with respect to the vertical direction can have a similar function with a similar configuration if a polarization axis is set accordingly.

Figure 13:
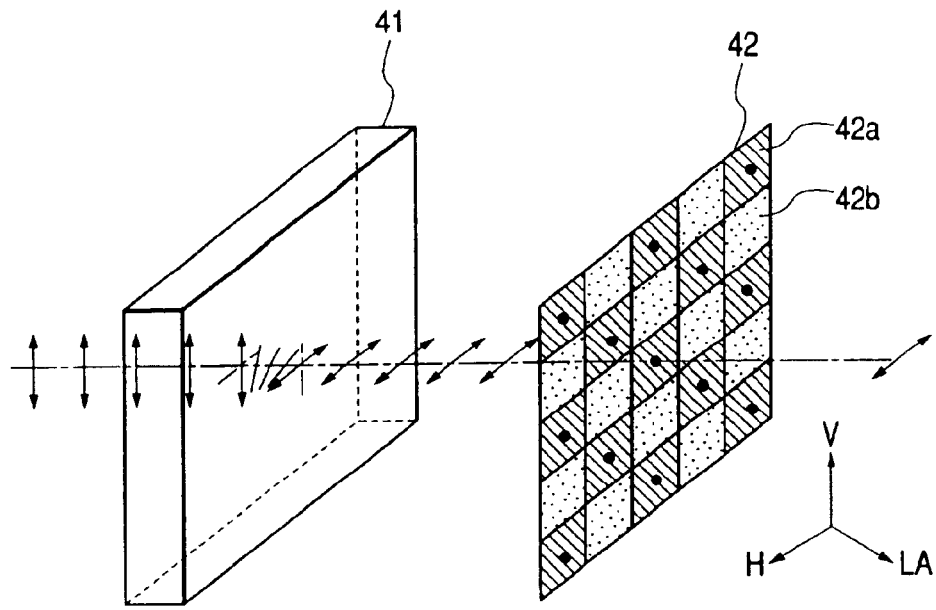
FIG. 13 is an explanatory view of a polarizer in accordance with the second embodiment of the present invention.
Figure 14:
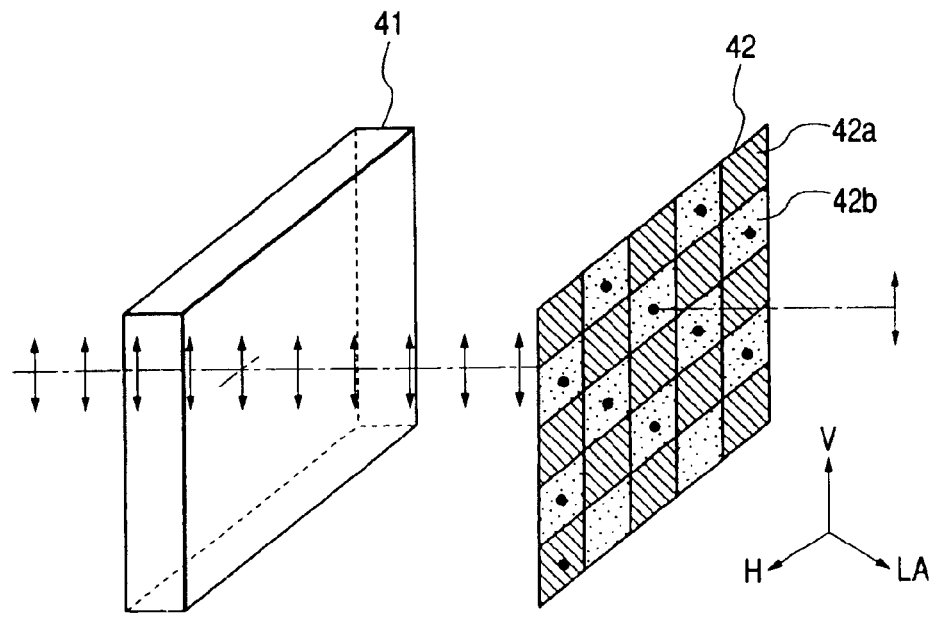
FIG. 14 is an explanatory view of a polarizer in accordance with the second embodiment of the present invention.

First, actions of the first phase shift member (π cell) 41 and the polarizer (polarizing optical device) 42 will be described first with reference to FIGS. 13 and 14. FIG. 13 illustrates an off case in which voltage is not impressed on the π cell 41 and FIG. 14 illustrates an on case in which voltage is impressed on the π cell 41. In any of the figures, a direction of a liquid crystal director in the π cell 41 and a variation of a polarization direction until the linearly polarized light that has been emitted from the image displaying device 1 are emitted into the polarizer (polarizing optical device) 42 are shown by perspective views. The polarizer 42 is a polarization plate on which 42a parts (shaded parts) and 42b parts (dotted parts) whose polarization axes cross each other are arranged in a checkered pattern.

If the impressed voltage on the π cell 41 is off (FIG. 13), the director of liquid crystal in the π cell 41 rotates 90° as it moves from an interface of the image displaying device 1 side of the π cell 41 to an interface of the polarizer 42 side.

The linearly polarized light having a polarized face oscillating in the plane of the paper surface, which has been emitted from the image displaying device 1, changes the polarization direction along the direction of the director when transmitting through the π cell 41, and becomes linearly polarized light oscillating in the horizontal direction (the direction perpendicular to the paper surface) and is emitted from the π cell 41. This light transmits through the polarization part 42a and is shielded in the polarization part 42b, thus, displaying image light transmission in a checked pattern.

To the contrary, if the impressed voltage on the π cell 41 is on (FIG. 14), the liquid crystal director in the π cell 41 is arranged substantially perpendicular to the interface of the π cell 41 (the travelling direction of light), and the linearly polarized light having an oscillating polarized face in a paper surface which has been emitted from the image displaying device 1 is emitted from the π cell 41 as the linearly polarized light of an oscillating polarized face in a paper surface without changing the polarization direction. This light is shielded in the polarization part 42a and transmits through the polarization part 42b. Therefore, the displaying image light is transmitted in a pattern that is interpolated with the transmitting part of a checkered pattern in the case in which the impressed voltage is off.

That is, it is understood that actions similar to those of the optical modulator 4 in the first embodiment are realized.

Operations of this embodiment will be described with reference to FIG. 12.

In this embodiment, the synthesized parallax image 9 shown in FIG. 7 and the synthesized parallax image 8 shown in FIG. 9 are alternately displayed on the image displaying device 1. In synchronism with the change of images, the image forming device 10 outputs a synchronizing signal to a driving device 12 of the first phase shift member (π cell) 41, and turning on/off impressed voltage on the first phase shift member (π cell) 41. Thus, the polarizer 42 transmits the displaying image light in a checkered pattern by the aforementioned action of the π cell, and a stereoscopic image of high resolution can be observed in a principle similar to that described in the first embodiment.

At this point, it is sufficient that the first phase shift member (π cell) 41 has electrodes arranged on its entire surface such that voltage is impressed over the entire surface. Therefore, the phase shift member (π cell) 41 can be easily manufactured and easily driven.

Naturally, it is possible to provide a plurality of electrodes in a horizontal stripe pattern to control a phase shift state for each block that is divided corresponding to scan lines of the image displaying device 1. In this case, it is possible to time a driving signal to each divided block of the first phase shift member (π cell) 41 by using a selection signal (horizontal synchronizing signal) to scan a line of the image displaying device corresponding to the position of the divided block.

FIGS. 15 to 19 illustrate the other embodiments of the polarizer 41 in this embodiment. Operations of this device will be described here. This embodiment is different from the aforementioned embodiment in that a device is used which is composed of a second phase member (second phase shift member) 421 and a polarizer 422 instead of the polarizer 42 on which the 42a parts (shaded parts) and the 42b parts (dotted parts) whose polarization axes cross each other are arranged in a checkered pattern, and in which phases of the second phase member 421 are processed as 0 or π in a checkered pattern.

Figure 15:
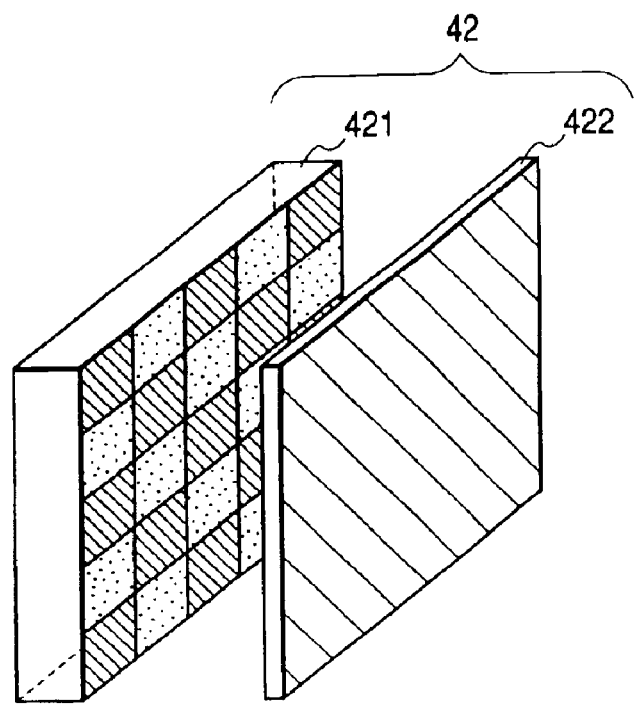
FIG. 15 is an explanatory view of a polarizer in accordance with the second embodiment of the present invention.

As described for the actions of the π cell above, a phase plate with a phase difference π rotates polarized face 90 degrees with respect to incident linearly polarized light. Therefore, as shown in FIG. 15, if the phases of the second phase member 421 are processed as 0 (shaded parts) and π (dotted parts) in a checkered pattern, the polarized face of the incident linearly polarized light is modulated in a checkered pattern by the second phase member 421.

Figure 16:
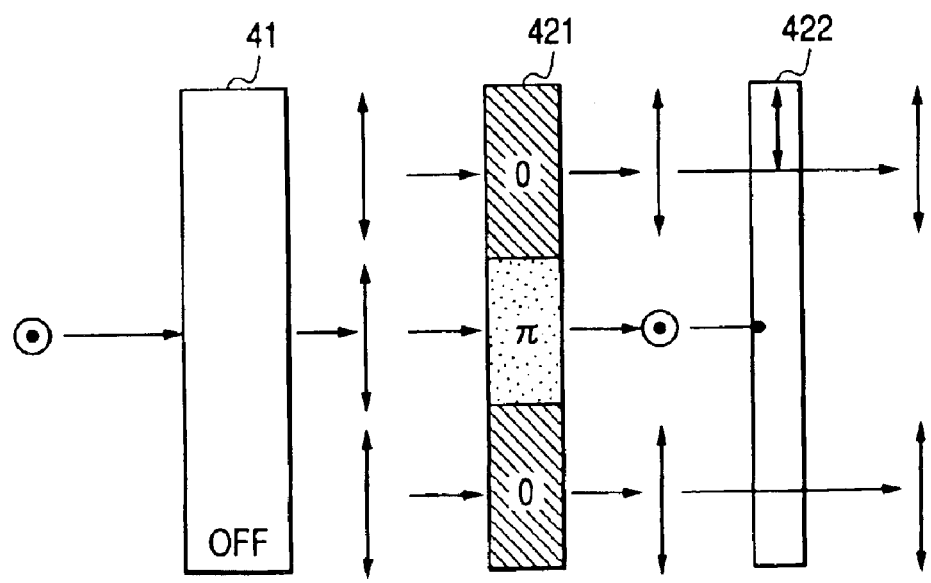
FIG. 16 is an explanatory view of a polarizer in accordance with the second embodiment of the present invention.

As shown in FIG. 16, if voltage is not impressed on the first phase shift member (π cell) 41, incident linearly polarized light (here, a polarized face perpendicular to a paper surface) has its polarized face rotated by 90 degrees by this π cell 41 and is incident on the second phase member 421 as polarized light having a polarized face in a paper surface. The polarized face is further rotated by 90 degrees at the part where the phase of the device 421 is π (dotted part), and transmits the incident linearly polarized light as polarized light having an oscillating surface perpendicular to a paper surface. On the other hand, in a part where the phase of the second phase member 421 is 0 (shaded part), the incident linearly polarized light is transmitted without rotating the polarized face. Therefore, in the polarization plate 422 which transmits only predetermined linearly polarized light (here, a transmitting polarization axis is within a paper surface), among the light having transmitted through the second phase member 421, only the light which has transmitted through the part where the phase of the second phase member 421 is 0 (shaded part) is transmitted and the light having transmitted through the part where the phase is π (dotted part) is shielded.

Figure 17:
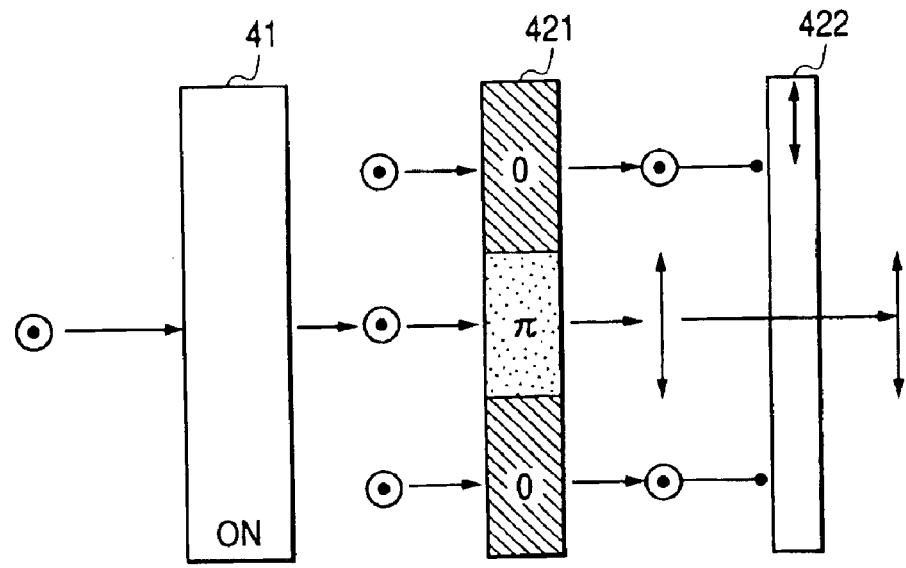
FIG. 17 is an explanatory view of a polarizer in accordance with the second embodiment of the present invention.

In addition, as shown in FIG. 17, if voltage is impressed on the first phase shift member (π cell) 41, the polarized face of the linearly polarized light incident on the second phase member 421 is 90 degrees different from the case of FIG. 16 because the polarized face is not rotated in this π cell 41. Therefore, the light having transmitted through the part where the phase is 0 (shaded part) is shielded and only the light having transmitted through the part where the phase is π (dotted part) is transmitted.

In this way, the light emitted from the polarization plate 422 takes a checkered pattern and causes light in a checkered pattern which interpolate each other by the on/off of the impressed voltage on the first phase shift member (π cell) 41 to transmit, thus, a stereoscopic image of high resolution can be observed with a principle similar to that described in the aforementioned embodiment.

Figure 18:
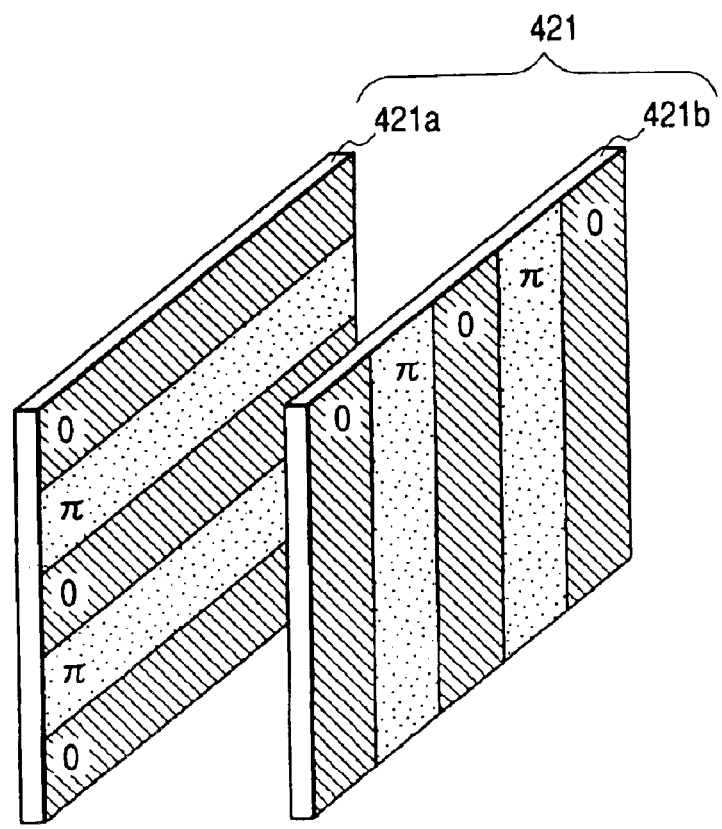
FIG. 18 is an explanatory view of a polarizer in accordance with the second embodiment of the present invention.
Figure 19:
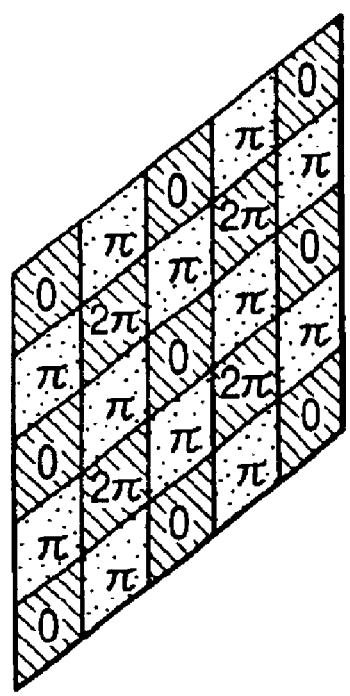
FIG. 19 is an explanatory view of a polarizer in accordance with the second embodiment of the present invention.

Although the case in which the phase of the second phase member 421 is processed as 0 (shaded parts) and π (dotted part) in a checkered pattern has been described in this context, it is possible to use two members 421a and 421b that are given the phases of 0 (shaded parts) and π (dotted parts) in horizontal stripe patterns and to cause the patterns to cross at right angles for use as shown in FIG. 18. In this case, the light transmitting through the two phase members are given a phase difference at each part, and have phase differences of 0, π, 2π (=0) as shown in FIG. 19.

As a result, as is evident from the figure, the phases become 0 and π in a checkered pattern, and can be given the same actions as the aforementioned second phase member 421. In this case, it is sufficient to manufacture a phase member having phase differences in a horizontal stripe pattern. Thus, there is an effect that a phase member can be easily and inexpensively manufactured.

(Third Embodiment)

Figure 20:
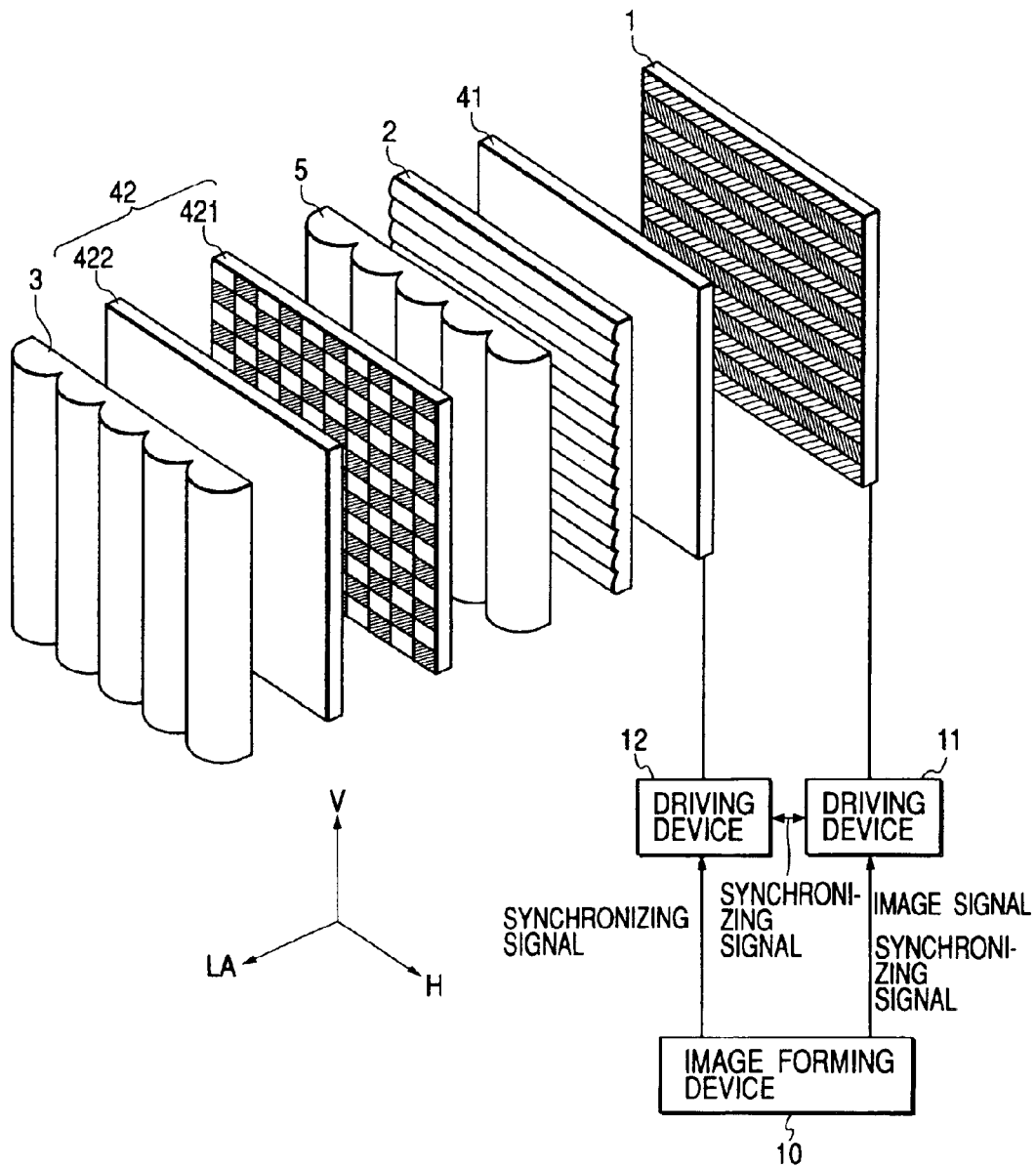
FIG. 20 is a perspective view showing a third embodiment of the present invention.

FIG. 20 illustrates a third embodiment of the present invention, in which identical reference numerals are given to the members identical with those of the figures already referred to. This embodiment is different from the second embodiment in that the first phase shift member (π cell) 41 is arranged immediately in front of the image displaying device 1 and, particularly, that it is arranged separately from the polarizer 42 (the second shift member 421 and the polarization plate 422) described with reference to FIGS. 12 to 19.

In this embodiment, each component is also arranged such that the relations (h1) to (h11) and (v1) to (v3) of the design parameters already described are satisfied. However, the polarizer 42 (or the second phase member 421 and the polarization plate 422) is arranged instead of the optical modulator 4 of the first embodiment, and an interval (optical distance) between each member is determined taking into account an optical thickness of the first phase shift member (π cell) 41 only.

In addition, it is sufficient to arrange the first phase shift member (π cell) 41 between the image displaying device 1 and the polarizer 42 (or 421 and 422) at a position where it does not interfere with the other members. Here, the first phase shift member (π cell) 41 is arranged between the image displaying device 1 and the horizontal lenticular lens 2.

Figure 21:
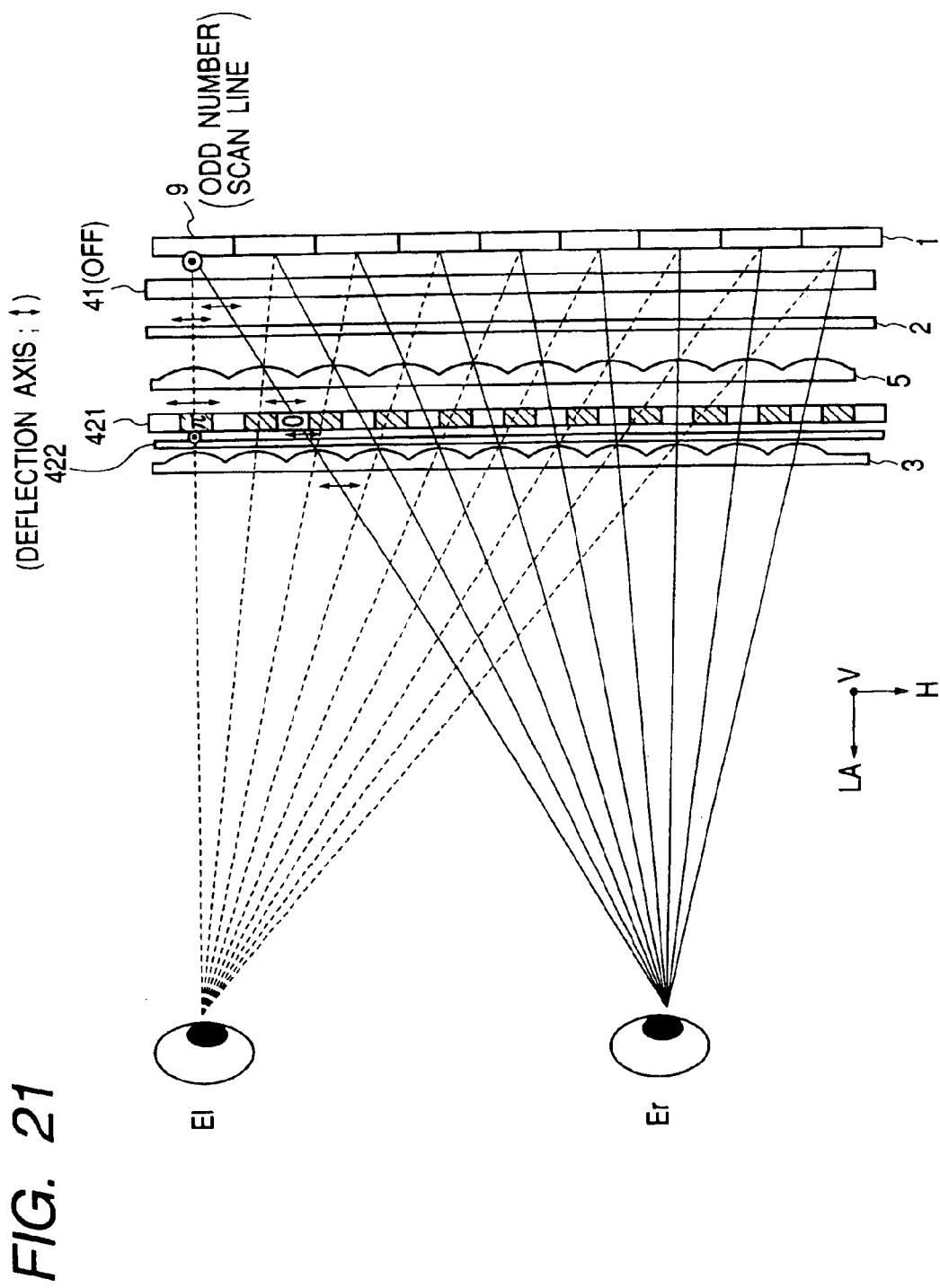
FIG. 21 is a horizontal section al view for illustrating actions in the horizontal direction in the third embodiment of the present invention.
Figure 22:
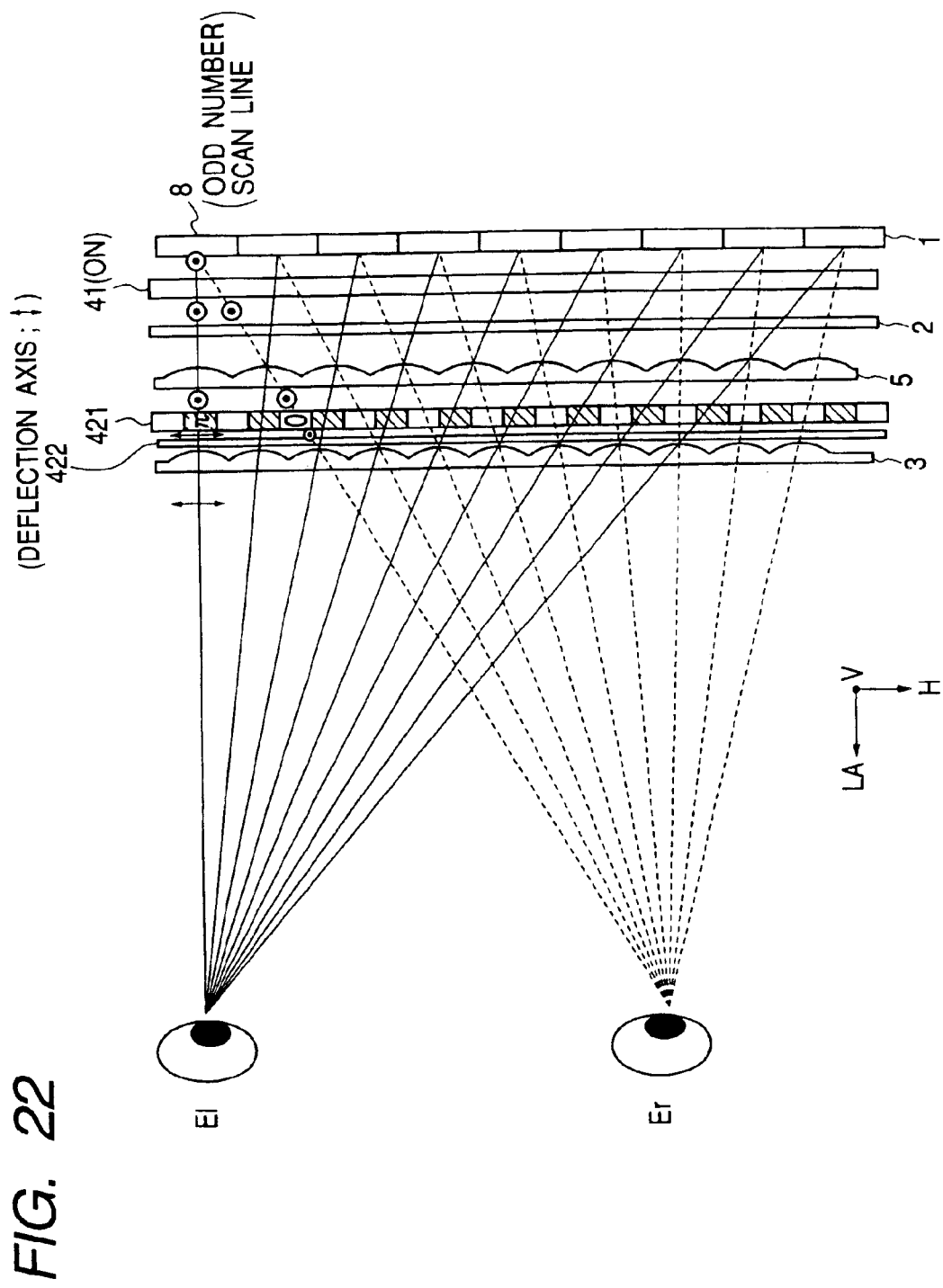
FIG. 22 is a horizontal sectional view for illustrating actions in the horizontal direction in the third embodiment of the present invention.

FIG. 21 is a sectional view of a horizontal cross section including an image line for the right eye (odd number scan line) at an instance when the synthesized parallax image 9 is displayed on the image displaying device 1, and FIG. 22 is a sectional view of a horizontal cross section including an image line for the left eye (odd number scan line) at an instance when the synthesized parallax image 8 is displayed on the image displaying device 1.

In this embodiment, the synthesized parallax image 9 shown in FIG. 7 and the synthesized parallax image 8 shown in FIG. 9 are alternately displayed on the image displaying device 1. In synchronism with the change of the images, the image forming device 10 outputs a synchronizing signal to the driving device 12 of the first phase shift member (π cell) 41 and turns on/off impressed voltage on the first phase shift member (π cell) 41.

Actions in the horizontal direction in this embodiment will be described.

In FIG. 21, image displaying light directing to the right eye Er are shown by solid lines and image displaying light directing to the left eye El are shown by broken lines. As is evident from FIG. 20, a face including these two groups of light is shifted in the vertical direction by a width of the scan line of the image displaying device 1.

Image displaying light (here, it is assumed to be linearly polarized light having a polarized face perpendicular to a paper surface) from each pixel of a line for the right eye (odd number scan line) of the synthesized parallax image 9 to be displayed on the image displaying device 1 has its polarized face rotated by 90 degrees by the first phase shift member (π cell) 41 to form polarized light having a polarized face in a paper surface and emitted.

Among these light fluxes, light collected by the second vertical lenticular lens 5 to a part where the phase of the second phase member 421 is 0 transmits without rotating the polarized face of the incident linearly polarized light, transmits through the polarization plate 422 that transmits only predetermined linearly polarized light (here, a transmitting polarization axis is within a paper surface (within an H-LA cross section)), and directs toward a position of the right eye Er of an observer.

On the other hand, light collected by the second vertical lenticular lens 5 to a part where the phase of the second phase member 421 is π (hatching part) has the polarized face of the incident linearly polarized light rotated by 90 degrees and transmits as polarized light having an oscillating surface in the vertical direction (V direction) in a paper surface. However, since the polarized face is perpendicular to a transmitting polarization axis of the polarization plate 422, the light is shielded. In this way, the image displaying light from each pixel of the line for the right eye (odd number scan line) of the synthesized parallax image 9 is caused to become incident on the right eye only.

As shown in FIGS. 15 to 19 and FIG. 20, since 0 and π are arranged in a checkered pattern as the phase of the second phase member 421, light emitted from the line for the left eye (even number scan line) shown by the dot lines in FIG. 21 is caused to become incident on the left eye only.

Therefore, when impressed voltage on the first phase shift member (π cell) 41 is off and the synthesized parallax image 9 is displayed on the image displaying device 1, only the image displaying light from each pixel of the odd number scan line becomes incident on the right eye, and the image displaying light from each pixel of the even number scan line is incident on the left eye.

Then, the image displaying device 1 is caused to display the synthesized parallax image 8, and the impressed voltage on the first phase shift member (π cell) 41 is turned on. At this point, as shown in FIG. 22, the image displaying light (here, the light is assumed to be linearly polarized light having a polarized face perpendicular to a paper surface) from each pixel of a line for the left eye (odd number scan line) of the synthesized parallax image 8 to be displayed on the image displaying device 1 transmits without rotating the polarized face by the first phase shift member (π cell) 41.

Among these luminous fluxes, although light collected by the second vertical lenticular lens 5 to a part where the phase of the second phase member 421 is 0 transmits without rotating the polarized face of the incident linearly polarized light, since the polarized face is perpendicular to a transmitted polarization light axis of the polarization plate 422, the light is shielded. On the other hand, the light collected by the second vertical lenticular lens 5 to a part where the phase of the second phase member 421 is π (hatching part) is caused to rotate the polarized face of the incident linearly polarized light 90 degrees, transmits as polarized light having an oscillating surface in a paper surface, and transmits through the polarization plate 422 to direct toward a position of the left eye El of an observer.

Therefore, when impressed voltage on the first phase shift member (π cell) 41 is on and the synthesized parallax image 8 is displayed on the image displaying device 1, only the image displaying light from each pixel of the odd number scan line becomes incident on the left eye, and only the image displaying light from each pixel of the even number scan line is incident on the right eye.

As described above, by alternately displaying the synthesized parallax image 9 and the synthesized parallax image 8 on the image displaying device 1 and turning on/off the impressed voltage on the first phase shift member 41 (π cell) in synchronism with the change of the images, an observer observes all pixels of each parallax image to be displayed on the image displaying device 1, thus, a stereoscopic image of high resolution can be observed. In addition, the stereoscopic image displaying method that can display a mixed image of a stereophonic image and a plane image with high resolution, or that can display a plane image with high resolution without flicker can be realized in the same manner as in the first embodiment.

Although the polarized light emitted from the image displaying device 1 is described here as the linearly polarized light oscillating in the direction perpendicular to a paper surface of the drawing for simplification of the description, even direct polarized light slanting 45 degrees with respect to the vertical direction can have a similar function with a similar configuration if a polarization axis is set accordingly.

In addition, it is also possible to arrange the polarization plate 422 in the observer side of the first vertical lenticular lens 3.

(Fourth Embodiment)

Figure 23:
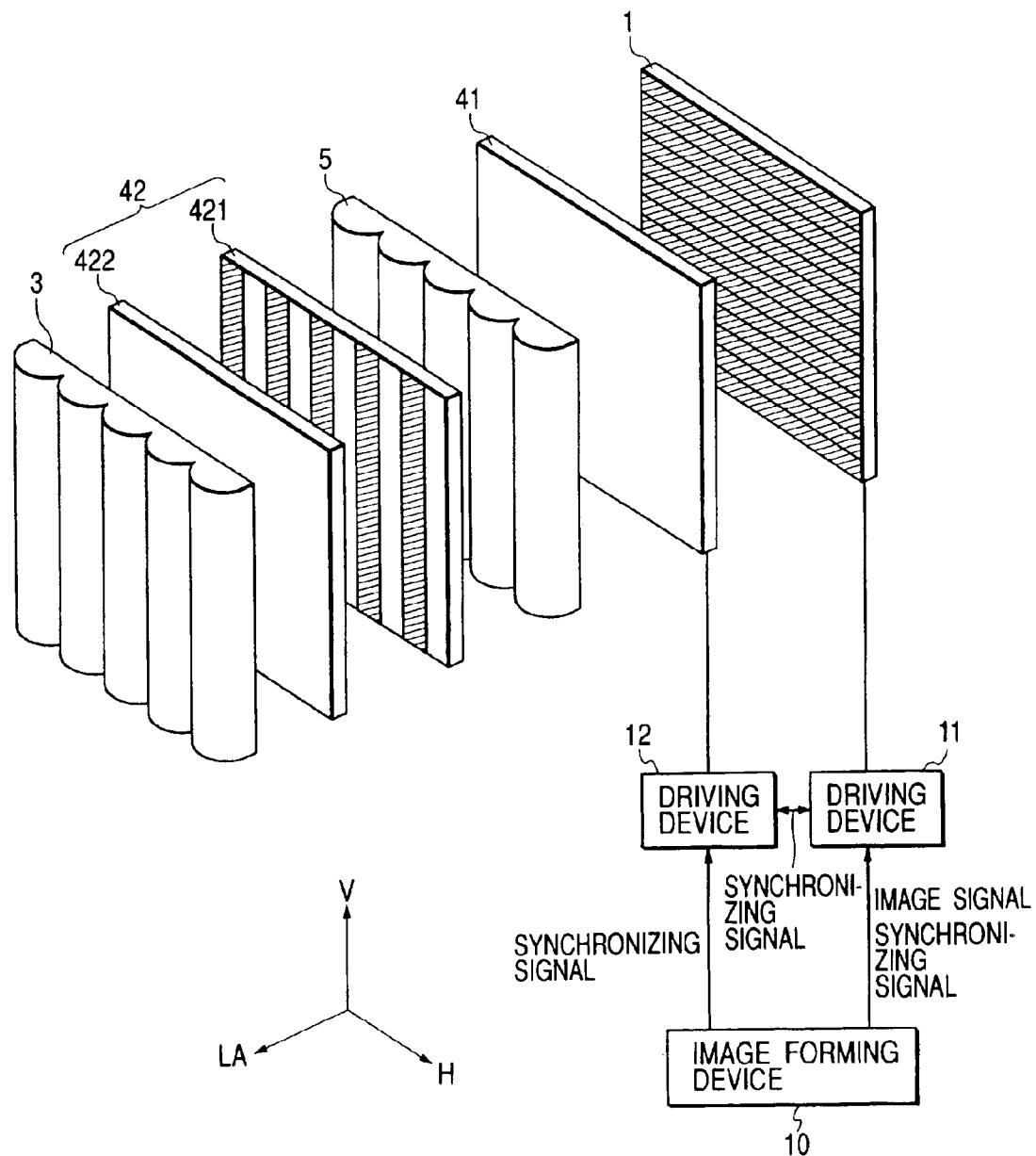
FIG. 23 is a perspective view showing a fourth embodiment of the present invention.

FIG. 23 describes a fourth embodiment of the present invention, in which identical reference numerals are given to the members identical with those in the figures already referred to.

This embodiment is different from the third embodiment in that the parallax images 6 and 7 corresponding to each of the left and the right eyes of an observer are alternately displayed on the image displaying device 1, phases of 0 and π are arranged in a vertical stripe pattern on the second phase member 421, and the horizontal lenticular lens 2 is unnecessary.

Figure 24:
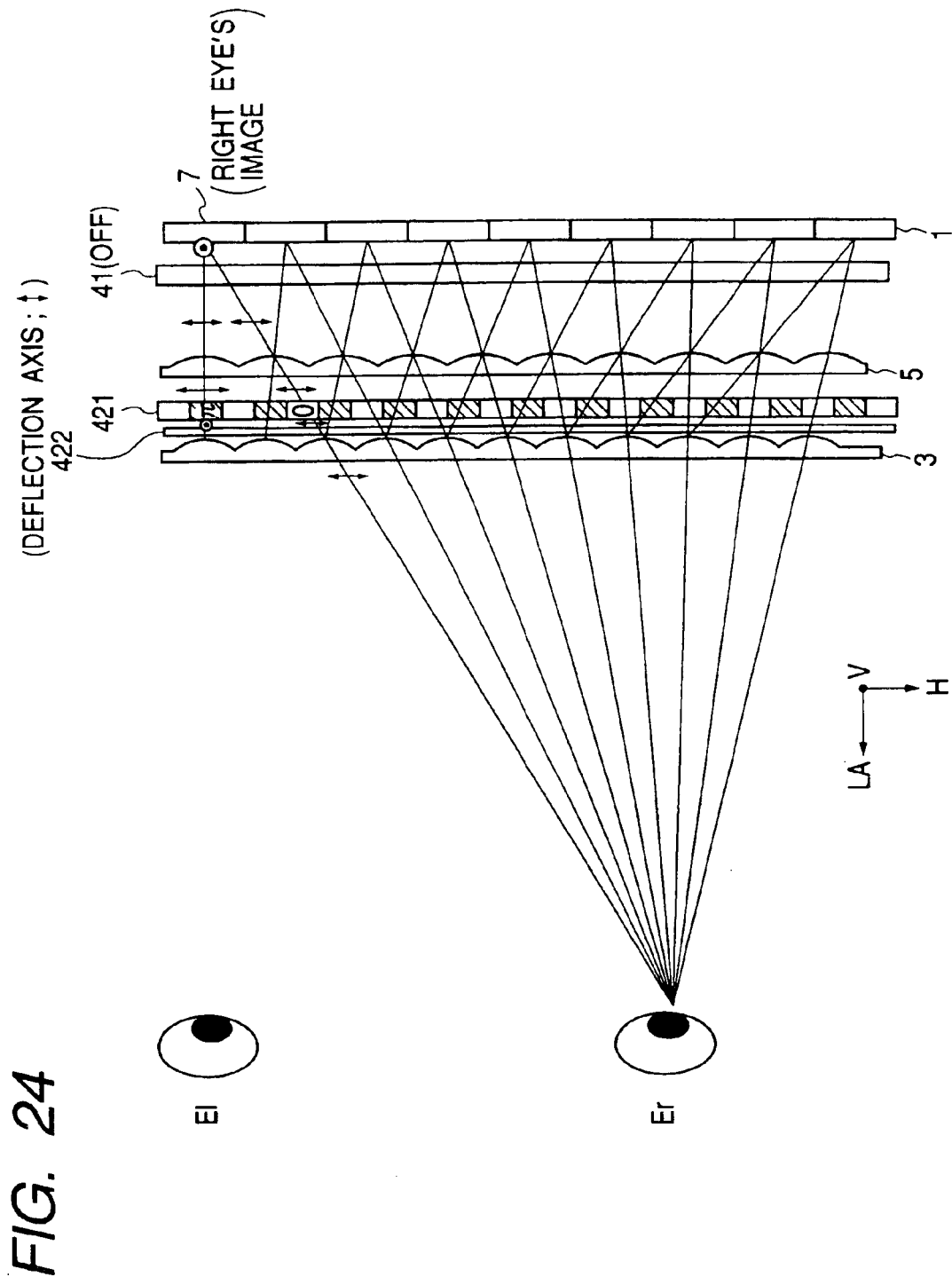
FIG. 24 is a horizontal sectional view for illustrating actions in the horizontal direction in the fourth embodiment of the present invention.
Figure 25:
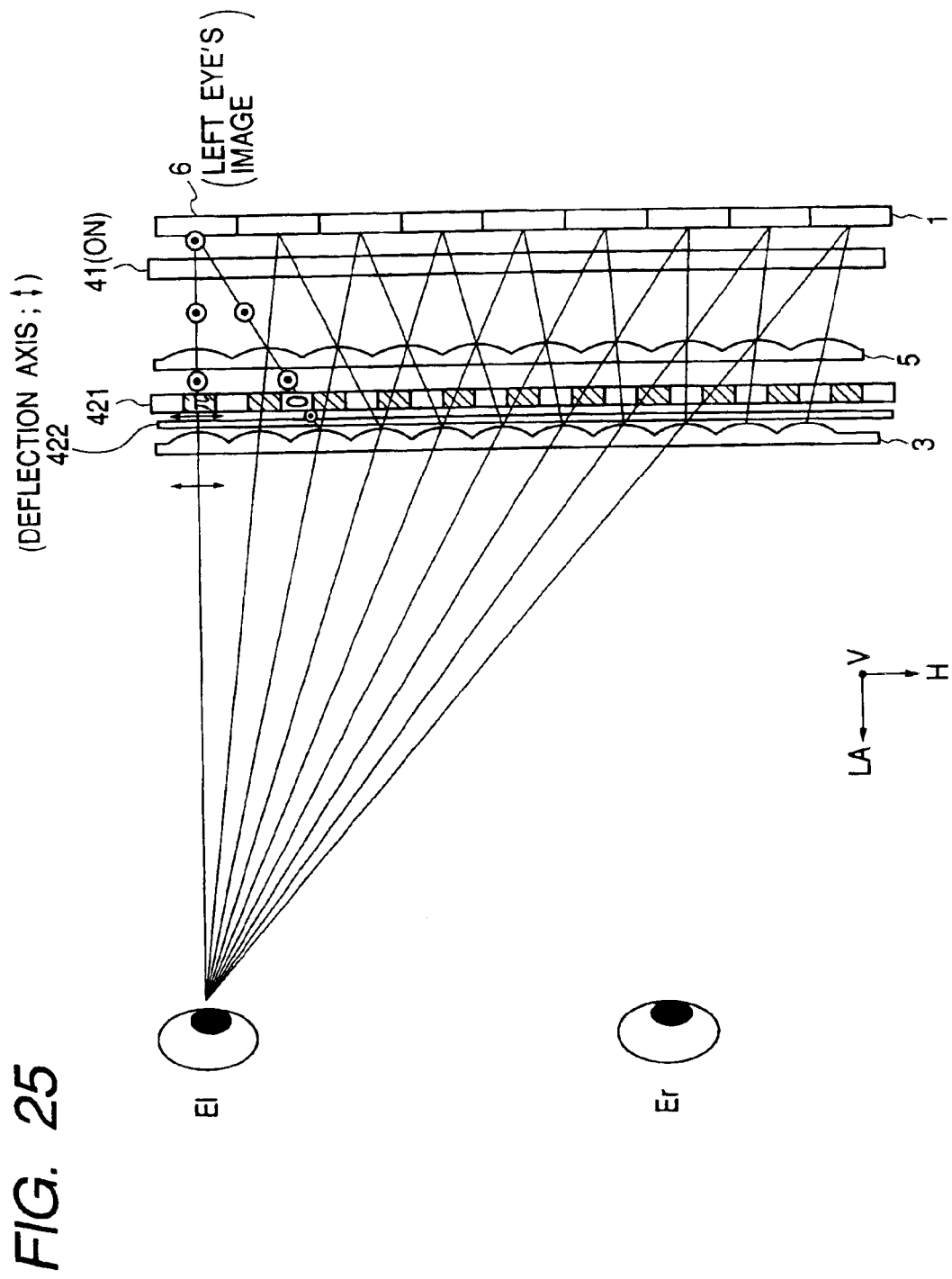
FIG. 25 is a horizontal sectional view for illustrating actions in the horizontal direction in the fourth embodiment of the present invention.

FIG. 24 is a sectional view on a horizontal cross section including both the eyes in the state in which the parallax image 7 for the right eye is displayed on the image displaying device 1 and the impressed voltage on the first phase shift member (π cell) 41 is off, and FIG. 25 is a sectional view on a horizontal cross section including both the eyes in the state in which the parallax image 6 for the left eye is displayed on the image displaying device 1 and the impressed voltage on the first phase shift member (π cell) 41 is on.

In this embodiment, the parallax image 7 for the right eye and the parallax image 6 for the left eye are alternately displayed on the image displaying device 1. In synchronism with the change of the images, the image forming device 10 outputs a synchronizing signal to the driving device 12 of the first phase shift member (π cell) 41 and turns on/off impressed voltage on the first phase shift member (π cell) 41.

Actions in the horizontal direction in this embodiment will be described.

As shown in FIG. 24, image displaying light (here, the light is assumed to be linearly polarized light having a polarized face perpendicular (V direction) to a paper surface) from each pixel of the parallax image 7 for the right eye displayed on the image displaying device 1 has the polarized face rotated by 90 degrees by the first phase shift member (π cell) 41 to form polarized light having a polarized face in a paper surface, and is emitted.

Among these light fluxes, light collected by the second lenticular lens 5 to a part where the phase of the second phase member 421 is 0 transmits without rotating the polarized face of the incident linearly polarized light, transmits through the polarization plate 422 that transmits only predetermined linearly polarized light (here, a transmitting polarization axis is within a paper surface (within an H-LA cross section)), and directs toward a position of the right eye Er of an observer.

On the other hand, light collected by the second vertical lenticular lens 5 to a part where the phase of the second phase member 421 is π (hatching part) has the polarized face of the incident linearly polarized light rotated by 90 degrees and transmits as polarized light having an oscillating surface in the vertical direction in a paper surface. However, since the polarized face is perpendicular to a transmitting polarization axis of the polarization plate 422, the light is shielded. In this way, the image displaying light from each pixel of the parallax image 7 for the right eye is caused to become incident on the right eye only.

As shown in FIG. 23, since 0 and π are arranged in a vertically striped pattern as the phase of the second phase member 421, the image displaying light from each pixel on a scan line other than that shown in FIG. 24 is also caused to become incident on the right eye only and, as a result, all the parallax images 7 for the right eye displayed on the image displaying device 1 are observed by the right eye.

Therefore, when impressed voltage on the first phase shift member (π cell) 41 is off and the parallax images 7 for the right eye are displayed on the image displaying device 1, all the parallax images 7 are observed by the right eye.

Then, the image displaying device 1 is caused to display the parallax images 6 for the left eye, and the impressed voltage on the first phase shift member (π cell) 41 is turned on. At this point, as shown in FIG. 25, the image displaying light (here, the light is assumed to be linearly polarized light having a polarized face perpendicular to a paper surface) from each pixel of the parallax images 6 for the left eye to be displayed on the image displaying device 1 transmits without rotating the polarized face by the first phase shift member (π cell) 41.

Among these luminous fluxes, although light collected by the second vertical lenticular lens 5 to a part where the phase of the second phase member 421 is 0 transmits without rotating the polarized face of the incident linearly polarized light, since the polarized face is perpendicular to a transmitted polarization axis of the polarization plate 422, the light is shielded. On the other hand, the light collected by the second vertical lenticular lens 5 to a part where the phase of the second phase member 421 is π (hatching part) is caused to rotate the polarized face of the incident linearly polarized light by 90 degrees, transmits as polarized light having an oscillating surface in a paper surface, and transmits through the polarization plate 422 to direct toward a position of the left eye El of an observer.

Therefore, when impressed voltage on the first phase shift member (π cell) 41 is on and the parallax images 6 for the left eye are displayed on the image displaying device 1, all these parallax images 6 are observed by the left eye.

As described above, by alternately displaying the parallax images 6 and 7 on the image displaying device 1 and turning on/off the impressed voltage on the first phase shift member (π cell) 41 in synchronism with the change of the images, an observer observes all pixels of each parallax image to be displayed on the image displaying device 1, thus, a stereoscopic image of high resolution can be observed. In addition, the stereoscopic image displaying method that can display a mixed image of a stereoscopic image and a plane image with high resolution, or that can display a plane image with high resolution without flicker can be realized by the same way as in the first embodiment.

In this embodiment, each component is also arranged such that the relations (h1) to (h11) of design parameters which have already been described are satisfied. However, in this embodiment, the polarizer 42 (or the second phase member 421 and the polarization plate 422) are arranged instead of the optical modulator 4 of the first embodiment, and an interval (optical distance) between each member is determined taking into account an optical thickness of the first phase shift member (π cell) 41 only.

In addition, it is sufficient to arrange the first phase shift member (π cell) 41 between the image displaying device 1 and the polarizer 42 (or the second phase member 421 and the polarization plate 422) at a position where it does not interfere with the other members. Here, the first phase shift member (π cell) 41 is arranged between the image displaying device 1 and the second vertical lenticular lens 5.

Figure 28:
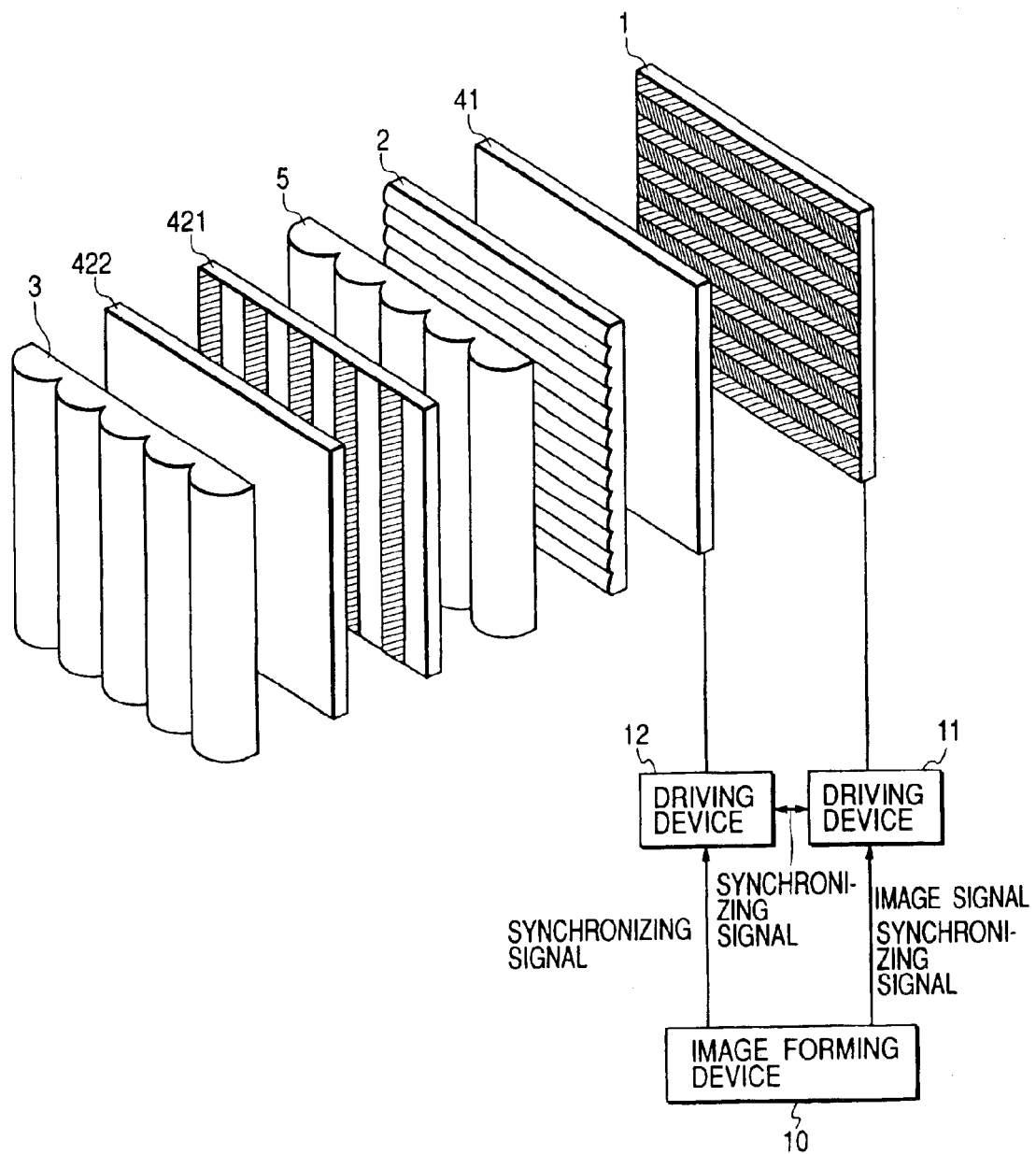
FIG. 28 is a view showing another configuration of the fourth embodiment of the present invention.

As is evident from the above descriptions, in this embodiment, an observation region corresponding to angle of visibility characteristics of the image displaying device 1 is formed in the vertical direction. However, as shown in FIG. 28, the horizontal lenticular lens 2 can also be used as in the third embodiment. In this case, it is sufficient to arrange each component such that the relations (v1) to (v3) of design parameters are satisfied.

Next, a stereoscopic image displaying method that can display a mixed image of a stereoscopic image and a plane image with high resolution, or that can also display a plane image with high resolution without flicker will be described.

Figure 26A:
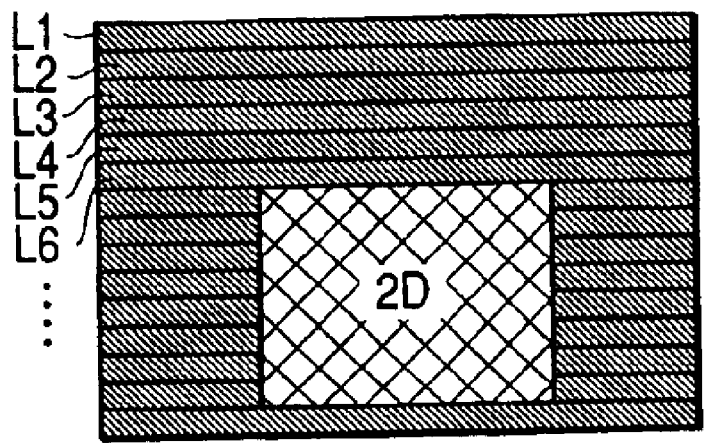
FIGS. 26A and 26B are explanatory views of a parallax image when a 2D image is mixed to be displayed in the fourth embodiment of the present invention.
Figure 26B:
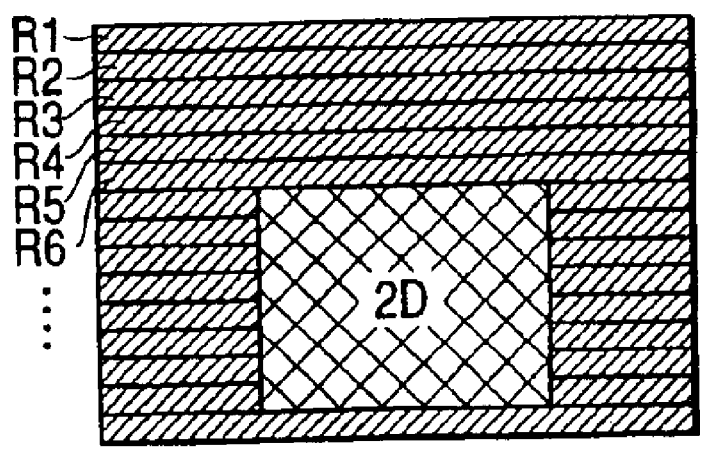

FIGS. 26A and 26B respectively show parallax images 6' and 7' to be displayed on the image displaying device 1 when the stereoscopic image and the plane image (2D image) are mixed to be displayed. A normal plane image (2D image) is synthesized and displayed at predetermined positions of the parallax images 6 and 7.

That is, when the impressed voltage on the first phase shift member (π cell) 41 is off and the parallax images 7 for the right eye are displayed on the image displaying device 1, all of these parallax images 7 are observed by the right eye and, when the impressed voltage on the first phase shift member (π cell) 41 is on and the parallax images 6 for the left eye are displayed on the image displaying device 1, all of these parallax images 6 are observed by the left eye, thus, the normal plane image (2D image) synthesized and displayed at the predetermined positions of the parallax images 6 and 7 can be observed by each eye.

Therefore, the plane image (2D image) without and parallax is seen by both eyes and parallax images corresponding to each eye are separately displayed in the other parts. As a result, an image which is displayed with high resolution, in which the stereoscopic image and the plane image (2D image) are mixed, can be observed on the same screen.

As described above, according to each embodiment, orientation of image displaying light to a viewpoint is performed regardless of a pixel position in the horizontal direction, a dark part where displaying light does not reach an observation surface by a so-called black matrix between pixels of an image displaying device is not generated, and theoretically, an effect of diffusion of display devices of a displayed image and diffraction due to a pixel structure is eliminated.

In addition, according to this embodiment, since all pixels of each of left and right parallax images are incident on each eye, it is possible to solve the problem in the conventional image display method requiring no spectacles that the resolution is reduced as the number of pixels is halved. Therefore, a stereoscopic image display of high resolution can be realized.

Moreover, a mixed image of a stereoscopic image and a plane image can be displayed with high resolution.

According to the present invention, a stereoscopic image displaying method and an apparatus using the same which do not require special spectacles can be provided which are capable of displaying a stereoscopic image with high resolution by reducing cross talk and moire, or are capable of, if necessary, displaying an image in which a stereoscopic image and a plane image are mixed or also a plane image with high resolution without flicker in a display apparatus when a stereoscopic image is observed.

What is claimed is:

1. A stereoscopic image displaying apparatus for guiding image light onto a predetermined observing plane so as to make an observer capable of observing a stereoscopic image, said apparatus comprising:

an image display element for displaying a synthesized parallax image which is obtained by alternately and vertically arranging and synthesizing a plurality of strip images for a left eye each of which is elongated in a horizontal direction and is obtained by dividing a parallax image for the left eye, and a plurality of strip images for a right eye each of which is elongated in a horizontal direction and is obtained by dividing a parallax image for the right eye;

a mask member having an aperture section and a light shielding section;

a first optical system for converging on the predetermined observing plane light beams emerging from the mask member; and a second optical system for guiding light beams emerging from the image display element onto the mask member, said second optical system including from the image display element sequentially a first lens array in which a plurality of first micro lenses are periodically arranged in a vertical direction and a second lens array in which a plurality of second micro lenses are periodically arranged in a horizontal direction, an optical characteristic in the vertical direction of the first lens array being different from an optical characteristic in the horizontal direction of the second lens array, wherein the image display element switches between a first synthesized parallax image obtained by alternately arranging with a first order the stripe image for the left eye and the stripe image for the right eye, and a second synthesized parallax image obtained by alternately arranging with a second order which is opposite to the first order the stripe image for the left eye and the stripe image for the right eye, and displays the first synthesized parallax image and the second synthesized parallax image, and wherein the aperture section and the light shielding section of the mask member are changed therebetween in synchronization with the switchover operation between the first synthesized parallax image and the second synthesized parallax image.

2. A stereoscopic image displaying apparatus according to claim 1, wherein the first optical system includes a first lens array in which a plurality of third micro lenses are periodically arranged in the horizontal direction.

3. A stereoscopic image displaying apparatus according to claim 2, wherein an apex of a second micro lens, an apex of a third micro lens, and a center of the aperture section or the light shielding section are arranged to be on a straight line obtained by connecting in a predetermined horizontal section a position of the left eye of the observer, a position of the right eye of the observer, and a whole of a plurality of pixels included by the image display element.

* * * * *

UNITED STATES PATENT AND TRADEMARK OFFICE
CERTIFICATE OF CORRECTION

| | |
|---|---|
| PATENT NO. | : 6,940,646 B2 |
| APPLICATION NO. | : 09/836368 |
| DATED | : September 6, 2005 |
| INVENTOR(S) | : Naosato Taniguchi et al. |

It is certified that error appears in the above-identified patent and that said Letters Patent is hereby corrected as shown below:

Title page,
Item [75], Inventors, "Yoshihiro Saito, Hadhhoy (JP);" should read -- Yoshihiro Saito, Hachioji (JP) --.
Item [56], References Cited, FOREIGN PATENT DOCUMENTS,
"2/1919" should read -- 2/1995 --.

Drawings
Sheet 8, Figure 8, "PIXCEL" (both occurrences) should read -- PIXEL --.

Column 2,
Line 17, "solve" should read -- achieve --.

Column 8,
Line 6, "is" should read -- are --; and "be checkered pattern like." should read -- have a checkered pattern --.

Column 11,
Line 1, "a" should be deleted.
Line 2, "sufficiently" should be deleted.
Line 53, "each" should read -- with each --.

Column 12,
Line 59, "an" should read -- a --.

Column 13,
Line 66, "checked" should read -- checkered --.

Column 14,
Line 45, "polarizer 41" should read -- polarizer 42 --.

Column 16,
Lines 29 and 30, "are" should read -- is --.

UNITED STATES PATENT AND TRADEMARK OFFICE
CERTIFICATE OF CORRECTION

PATENT NO. : 6,940,646 B2
APPLICATION NO. : 09/836368
DATED : September 6, 2005
INVENTOR(S) : Naosato Taniguchi et al.

It is certified that error appears in the above-identified patent and that said Letters Patent is hereby corrected as shown below:

Column 17,
Line 47, "stereophonic" should read -- stereoscopic --.

Column 20,
Lines 55 and 58, "strip" should read -- stripe --.

Signed and Sealed this

Eleventh Day of July, 2006

JON W. DUDAS
*Director of the United States Patent and Trademark Office*